United States Patent
Ravindran et al.

(10) Patent No.: US 10,602,416 B2
(45) Date of Patent: Mar. 24, 2020

(54) SEAMLESS CONSUMER MOBILITY IN INFORMATION CENTRIC NETWORKS USING FORWARDING LABELS

(71) Applicant: Futurewei Technologies, Inc., Plano, TX (US)

(72) Inventors: Ravishankar Ravindran, San Ramon, CA (US); Asit Chakraborti, Pleasanton, CA (US); Aytac Azgin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 179 days.

(21) Appl. No.: 15/649,452

(22) Filed: Jul. 13, 2017

(65) Prior Publication Data
US 2018/0359673 A1 Dec. 13, 2018

Related U.S. Application Data

(60) Provisional application No. 62/518,449, filed on Jun. 12, 2017.

(51) Int. Cl.
*H04L 12/721* (2013.01)
*H04L 29/06* (2006.01)
(Continued)

(52) U.S. Cl.
CPC ....... *H04W 36/18* (2013.01); *H04W 36/0033* (2013.01); *H04W 36/02* (2013.01); *H04W 36/08* (2013.01); *H04W 36/305* (2018.08)

(58) Field of Classification Search
CPC . H04W 36/18; H04W 36/0033; H04W 36/02; H04W 36/0011; H04W 36/08;
(Continued)

(56) References Cited

U.S. PATENT DOCUMENTS

2002/0141360 A1* 10/2002 Baba ................ H04W 36/0011
370/331
2013/0227166 A1* 8/2013 Ravindran ............ H04L 67/327
709/238

(Continued)

OTHER PUBLICATIONS

Provisional Patent Application, Naming Data in a Hybrid Information-Centric Network, U.S. Appl. No. 62/462,253, filed Feb. 22, 2017 (Year: 2017).*

(Continued)

*Primary Examiner* — Edan Orgad
*Assistant Examiner* — Vanneilian Lalchinthang
(74) *Attorney, Agent, or Firm* — Vierra Magen Marcus LLP

(57) ABSTRACT

Technology providing seamless mobility to mobile processing devices in an Information Centric Network (ICN) is provided. A first point of attachment (PoA) is configured to communicate with a first processing device identified by a device ID and receive content objects addressed to the first processing device. The first PoA is further configured to determine that the first processing device is no longer communicating with the first PoA and moving to a second PoA, and generate a forwarding label identifying the second PoA and the device ID. The first PoA is further configured to append the forwarding label to any content object addressed to the first processing device and not forwarded by the first PoA to the first processing device before it moves, and forward each such content object to the second PoA.

20 Claims, 16 Drawing Sheets

(51) Int. Cl.
*H04L 12/741* (2013.01)
*H04W 36/18* (2009.01)
*H04W 36/08* (2009.01)
*H04W 36/02* (2009.01)
*H04W 36/00* (2009.01)
*H04W 36/30* (2009.01)

(58) Field of Classification Search
CPC .... H04W 36/305; H04W 80/04; H04L 69/22; H04L 45/30; H04L 45/38; H04L 45/72; H04L 45/306; H04L 45/34; H04L 61/15
USPC ........................................................ 370/331
See application file for complete search history.

(56) References Cited

U.S. PATENT DOCUMENTS

| | | | | |
|---|---|---|---|---|
| 2015/0039681 | A1* | 2/2015 | Gupta | H04L 65/4084 709/203 |
| 2015/0188813 | A1* | 7/2015 | Ravindran | H04L 45/72 370/392 |
| 2016/0043940 | A1* | 2/2016 | Mahadevan | H04L 45/566 709/223 |
| 2016/0094439 | A1* | 3/2016 | Ravindran | H04L 45/306 709/238 |
| 2016/0134530 | A1* | 5/2016 | Ravindran | H04L 45/72 370/392 |
| 2016/0366620 | A1* | 12/2016 | Royon | H04L 67/10 |
| 2017/0034240 | A1* | 2/2017 | Scott | H04L 67/2842 |
| 2018/0103128 | A1* | 4/2018 | Muscariello | H04L 45/745 |

OTHER PUBLICATIONS

Ravindran, et al.., "Realizing Mobility-as-a-Service (MAS) over CCN", IETF/ICNRG—Paris Interim, Jan. 14, 2016.

Azgin, et al., "Seamless Producer Mobility as a Service in Information Centric Networks", Sep. 26, 2016, pp. 243-248.

Ravindran, et al.., "Forwarding-Label Support in CCN Protocol draft-ravi-icnrg-ccn-forwarding-label-00", Nov. 16, 2016, pp. 1-16.

* cited by examiner

| PIT | | | | |
|---|---|---|---|---|
| NAME | Inbound Face | Outbound Face | ID | |
| /producer/path/name1 | F-x1 | F-y1 | C-ID-1 | |
| /producer/path/name2 | F-x2 | F-y2 | C-ID-2 | |
| /producer/path/name3 | F-x3 | F-y3 | C-ID-3 | |
| /producer/path/name4 | F-x4 | F-y4 | C-ID-4, C-ID-5, ... C-ID-N | |

| FLT | | | | |
|---|---|---|---|---|
| ID | Type | Face | FL | |
| C-ID-1 | Consumer | F-x1 | | |
| C-ID-2 | Consumer | NA | FL: POA - 2 | |
| P-ID-3 | Producer | F-y2 | | |
| C-ID-3 | Consumer | F-x2 | F-x2 | |

*FIG. 5*

SEAMLESS CONSUMER MOBILITY IN INFORMATION CENTRIC NETWORKS USING FORWARDING LABELS

BACKGROUND

An Information centric network (ICN) is a network that allows applications to bind to application-centric identifiers (IDs) exposed to the network layer entity (where the ID can represent any content, device, service, etc.), rather than to bind with one specific form of naming like an internet protocol (IP) address that represents physical location where that data is to be retrieved from, named hosts. In an ICN, packets are exchanged based on the name of the content or data. A content-centric network (CCN) or named data network (NDN) is an example implementation of the ICN that permits fetching data identified by a given name.

One aspect of the ICN that may be different from traditional Internet Protocol (IP) networks is the ability of the ICN r to interconnect multiple geographical points and cache content temporarily so that content can be served from the network instead of an original server. Mobile devices which connect to ICNs may do so at a Point of Attachment (PoA), which may themselves include content caches. Mobile devices will connect and disconnect from various PoAs in the network as they move. Generally, interests expressed by a mobile device at one PoA must be re-expressed at a new PoA to which that device has moved in order to have the named content delivered to the device at the new PoA.

BRIEF SUMMARY

One general aspect of the technology includes an information centric network (ICN) system. The ICN includes a first point of attachment (PoA) configured to communicate with a first processing device identified by a device ID associated with the processing device and receive content objects addressed to the first processing device. The first processing device may be considered a "consumer" processing device. The first PoA is further configured to determine that the first processing device is no longer communicating with the first PoA and is moving to a second PoA, and generate a forwarding label identifying the second PoA and the device ID. The first PoA is further configured to append the forwarding label to any stored content object addressed to the first processing device and not forwarded by the first PoA to the first processing device when the first processing device is no longer communicating with the first PoA. The first PoA is further configured to forward each said stored content object not forwarded by the first PoA to the first processing device to the second PoA. Other embodiments of this aspect include corresponding computer systems, apparatus, and computer programs recorded on one or more computer storage devices, each configured to perform the actions of the first PoA discussed above.

In another embodiment, the first processing device is a consumer processing device and the first PoA is configured to communicate with the first processing device to receive interest packets addressed to the first processing device for content provided by a second processing device, the interest packets identifying the first PoA, and receive content objects associated with the interest packets from the second processing device.

In another embodiment, the ICN further includes a second PoA configured to receive content objects from the first PoA, the content objects including the forwarding label including the device ID; store the content objects; determine using the device ID that the first processing device is communicating with the second PoA; and communicate with the first processing device to forward the content objects received to the first processing device.

In another embodiment, the ICN further includes at least one intermediate router, the intermediate router comprising a non-transitory memory storage comprising instructions; and one or more processors in communication with the memory. The one or more processors execute the instructions to: receive an interest request from the first PoA, the interest request associated with the device ID; updating the PIT entry for each interest request associated with the consumer ID upon receiving the interest request.

Another embodiment includes a method of operating a router in an information centric Network (ICN), including: receiving interest requests from a first PoA, each interest request including a consumer ID; storing a pending interest table (PIT) entry for each interest request associated the consumer ID; receiving first content objects in response to the interest requests and forwarding the content objects based on an associated PIT entry and the consumer ID; receiving second contents object including a forwarding label identifying, for the consumer ID, a second PoA to which content objects associated with the consumer ID should be forwarded; and forwarding the content object including a forwarding label to the second PoA. Other embodiments of this aspect include corresponding computer systems, apparatus, and computer programs recorded on one or more computer storage devices, each configured to perform the actions of the methods.

A further aspect includes an information centric networking (ICN) system, including a point of PoA configured to: receive content objects associated with interest packets generated by a first processing device the content objects received from a second PoA, the content objects including forwarding labels appended to the content objects, the forwarding labels identifying the first processing device associated with the content objects using a device ID and identifying the first PoA; store the content objects; determine that the first processing device is communicating with the first PoA; and communicate with the first processing device to forward the content objects received to the first processing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying Figures for which like references indicate elements.

FIG. 5 illustrates two data structures used in a PoA in accordance with the present technology.

DETAILED DESCRIPTION

The disclosure relates to technology for providing seamless mobility to a mobile node in an information centric network. The technology disclosed herein achieves better performance in user device mobility between points of access using a Forwarding Label (FL) associated with content objects. Each user processing device utilizes a unique identifier, referred to herein as a consumer identifier (ID) (or a producer ID). The consumer or producer ID may be a unique device ID. Each user processing device registers its consumer ID with the PoA to which it is attached. The consumer ID could be the IMSI number associated with the end devices, or any other globally or domain specific unique ID assigned to the processing device. A Forwarding Label Table (FLT) is used to map the consumer ID to a local face of the PoA, and the FL if applicable. In one embodiment, the FL may be set to the local PoA before the mobile device moves, and to another PoA during or after mobility. The consumer processing device records the state of the face as active or inactive in the FLT. If the face is inactive, the FL can be associated with a content object returned to the PoA in response to an interest request made by device having the consumer ID so that the content object is forwarded to a new PoA to which the processing device has moved. This improves the speed at which content objects can be delivered to user devices moving between PoAs in the network.

Figure 1:
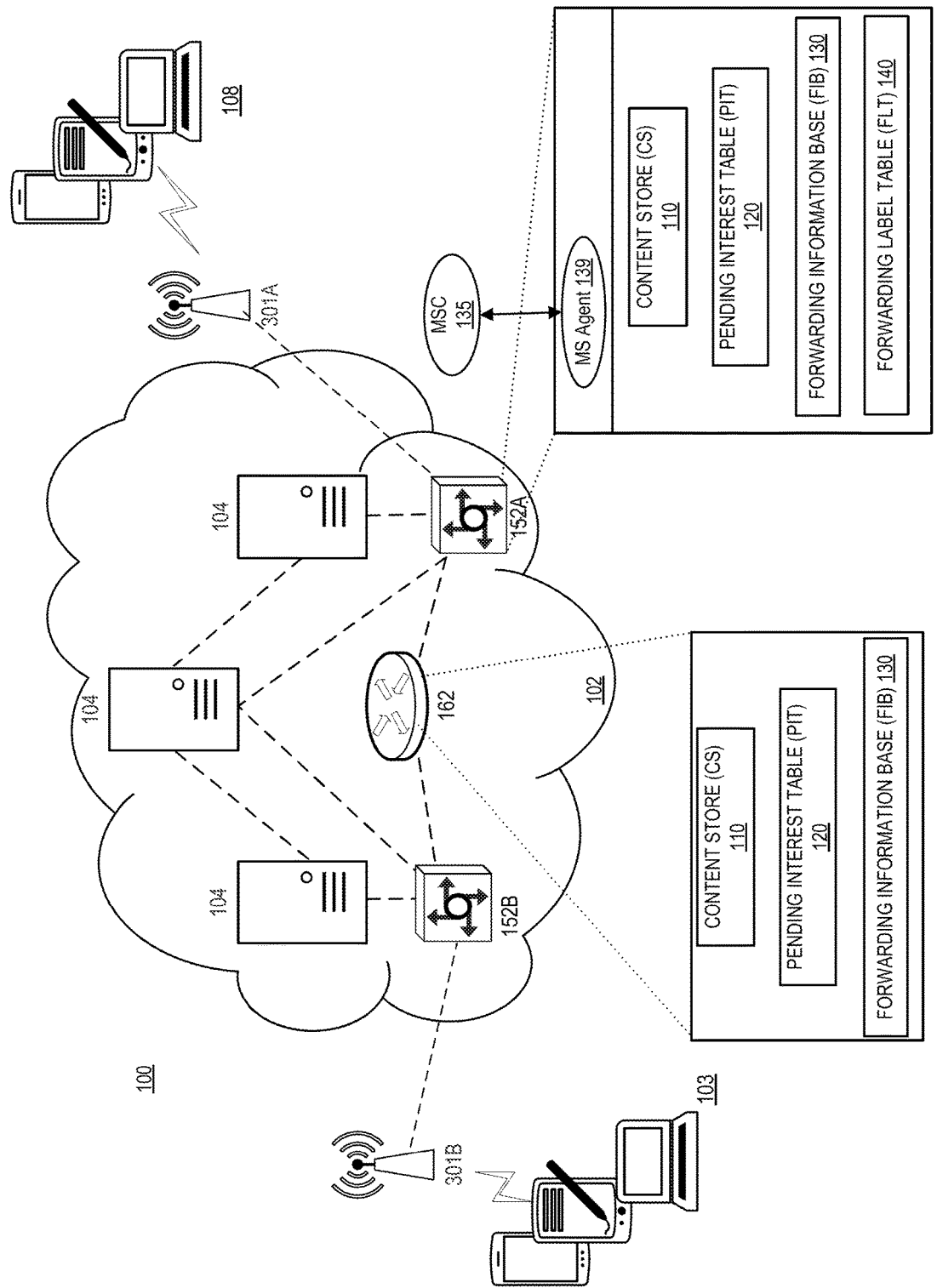
FIG. 1 illustrates a network architecture to provide content as requested by different users in an information centric network.

FIG. 1 illustrates a network architecture to provide content in response to information requests promulgated by users operating processing devices in an information centric network. The network environment 100 may include an ICN 102, also referred to as a content oriented network (CON), having controllers, such as ICN managers 104. The ICN managers 104 may be, for example, a network entity that may have control over a set of network resources in a data plane. In one embodiment, the ICN managers 104 maintain a synchronized record of content and/or named resources such as application names or end points hosted by different network entities in the ICN 102. The ICN managers comprise mapping controllers which map resource names to PoA names. Other ICN functionalities may include, name registration, resolution, routing, and management.

ICN 102 may also include routers (or nodes) 152a, 152b, 162, which may include storage to cache content objects as the content objects propagate through the ICN 102. In the context of this disclosure, routers 152a and 152b are considered PoAs, while router 162 may be considered a core or service router. PoAs include mobility functions provided by a mobility service, as described below. The routers 152a, 152b, may also be communicatively coupled with the ICN managers 104 for name resolution (but only for 152a/b)and may be configured to process requests received from users for accessing the content via clients or user devices 103, 108 coupled to access points or base-stations 301A, 301B which are themselves coupled to PoAs 152a, 152b.

The routers 152a, 152b, 162 may collaborate for caching content with one or more other routers 152a, 152b, 162 in the network. All routers 152a, 152b, 162 may include a content store (CS) 110, pending interest table (PIT) 120, and forwarding information base (FIB) 130. Also shown in FIG. 1 PoA routers 152a, 152b may also include a FLT, discussed below. The CS 110 may be used (e.g., in a storage or memory unit) to cache (for relatively short time) or store (for relatively longer time) content objects. The CS 110 may also receive and associate interests (user requests for content, referred to herein as "interest requests",) with corresponding content objects (requested content).

To carry out the interest request and data packet forwarding functions, each router 152a, 152b, 162 may maintain the three data structures described above, namely: (1) a CS 110 acting as a temporary cache of data packets the router has received, which cached data packets may be used to satisfy future interests; (2) a PIT 120 to store the interests (or a subset of them for which stateful forwarding is enabled) that a router has forwarded but not satisfied yet, where each PIT entry records the data name carried in the interest request (or a router designated name associated with the interest request), together with its incoming and outgoing face(s); and (3) a FIB 130 as a routing/forwarding table which maps name components to faces, and is populated by a name-prefix-based routing protocol for instance through the routing information base (RIB) for which the name-prefix-based routing protocol originates, and can have multiple output faces for each prefix. Additionally, the routers 152a, 152b, 162 may include forwarding policies and rules to handle forwarding of packets.

The PIT 120 may be any data structure (e.g., a table, list, or database) used to record and keep track of the received interests (requests for content) that are being served or pending (until the corresponding requested content data is received). The interests may be associated in the PIT 120 with the previous hops (or next hop faces) of each router on which the interests were received.

The FIB 130 may be any data structure (e.g., a table, list, or database) used to associate content or namespace with corresponding ports or faces (for next hops) on which the interests and content data are received and forwarded, depending on the implemented forwarding policies. The FIB 130 entries may indicate the next hops on which content or packets (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the routers 152a, 152b, 162.

The PoA routers 152a, 152b may also include a mobility service (MS) agent 139 in communication with a mobility service controller (MSC) 135. In another embodiment, the ICN manager 104 may serve as the MSC controller where mapping is managed.

Core router 162 is illustrated as utilizing a content store 110, PIT 120 and FIB 130; for each core router 162, the additional components present in the PoAs (such as PoA 152a, 152b) need not be utilized. In one embodiment (illustrated), core routers such as router 162 do not include the MS agent 139.

In one embodiment, when entities (e.g., consumers and producers) register to a network for mobility service, interest and data packets may be marked by setting a mobility flag.

MSC 135 is a service controller that is responsible for managing service profiles and resolving mapping of names for requests received from the ICN 102 to locators (e.g., domain identifiers or map identifiers). For example, service profiles may include mobility service specification and service level agreements (SLAs) (e.g., geographic limits for providing the mobility service). Within the MSC 135, the entity that maps services and names with the associated mobility requirements is referred to as a user profile manager. With the assistance of the MSC 135, mobility-as-a-service can be enabled and allow content providers to request to have mobility service enabled for their subscribers. In this case, the MSC 135 would push policies into the ICN 102 to provide mobility support for the corresponding service flows.

Also included in PoA routers 152a, 152b is the FLT, also referred to as the FLT cache table. Although referred to as a "table", it should be understood that the FLT may take the form of any data structure suitable for storing the information described herein. To enable mobility service support at the data plane, instead of relying solely on the FIB, the FLT is used cache the name-to-locator mappings or forwarding labels ("FLs"). The FLT may be implemented as a hash-table (with longest prefix matching used to locate a matching entry), in which entries are controlled by the MSC through on-demand resolution or proactive provisioning.

After an FLT entry is deleted due to timeout, any incoming request triggers a new resolution through the MSC. In one embodiment, FLT is a software-defined component that can be used by any other service to provide opportunistic routing to the supported service.

A FL is an object that acts as a locator and provides the flexibility to forward interest requests based on a topological name other than the one provided within the original interest request. The FL may be modified "on the fly" as it passes each hop in a network. FL objects may be considered as container objects that include a Locator ID (LID), service specific metadata and (optionally) security attributes for authentication. A LID is considered as a hierarchically structured topological name representing domain, gateway, or host IDs.

Previously, proposed FL objects were described as inserted within the interest request either by a consuming application (on a consumer device) or by the network. An FL object can be modified within the network and is considered as part of the optional hop-by-hop header.

In one example embodiment, when each router 152a, 152b, 162 receives an interest request (which may be in the form of an interest packet), which includes for example the name of the content that the requester (consumer) wants to request, the router first checks to determine if there is a locally cached copy of the content in the CS 110. If a locally cached copy of the content exists in the CS 110, the router can reply to the interest request by sending the content copy to the incoming face of the interest. Note that herein the term "interest packet" will be understood to be a packet that seeks content in an ICN. Herein the term "data packet" will be understood to be a packet that returns content (e.g., a content object or "CO") in an ICN in response to a request for that content.

If no locally cached copy of the content exists, the content router 152a, 152b, 162 checks to determine if there are pending interests in the PIT 120 with the same content name. If a request targeting the same content name exists and is pending, then the incoming face of the new interest request is added to the incoming face list for the content name in the PIT 120. Accordingly, the new interest is no longer required to be forwarded.

Otherwise, the router 152a, 152b, 162 forwards the interest request by performing a lookup, such as a longest-prefix matching based lookup, in the FIB 130 based on the content name. The interest request is then stored in the PIT 120 by creating a new entry. If no matched entry is maintained in the FIB 130, then the interest request is either dropped or forwarded to a face or a multiple of faces other than the incoming face, depending on the forwarding strategy implemented by the receiving router.

The network environment 100 may include one or more user devices 103, 108, including for example and without limitation, desktop computers, hand-held devices, laptops or other portable computers, network computers, mobile phones, landline phones, and the like. User devices 103, 108 may be referred to herein as user equipment (UE), and/or "consumer" or "producer" depending on the role of the device in a communication sequence.

Ones of the routers 152a, 152b, be configured as aggregation points that control multiple base stations or access points 301. The router may thus serve as PoA for user devices 103, 108 connecting to the ICN 102. It should be understood that each of the user devices 103, 108 may comprise a consumer, a producer or both within the context of this disclosure. It should be further understood that multiple user devices may connect to each base station and PoA, and that the number of devices and network components illustrated herein is smaller than in an actual ICN. An ICN may contain a large number of user devices, routers, controllers and base stations.

Figure 2:
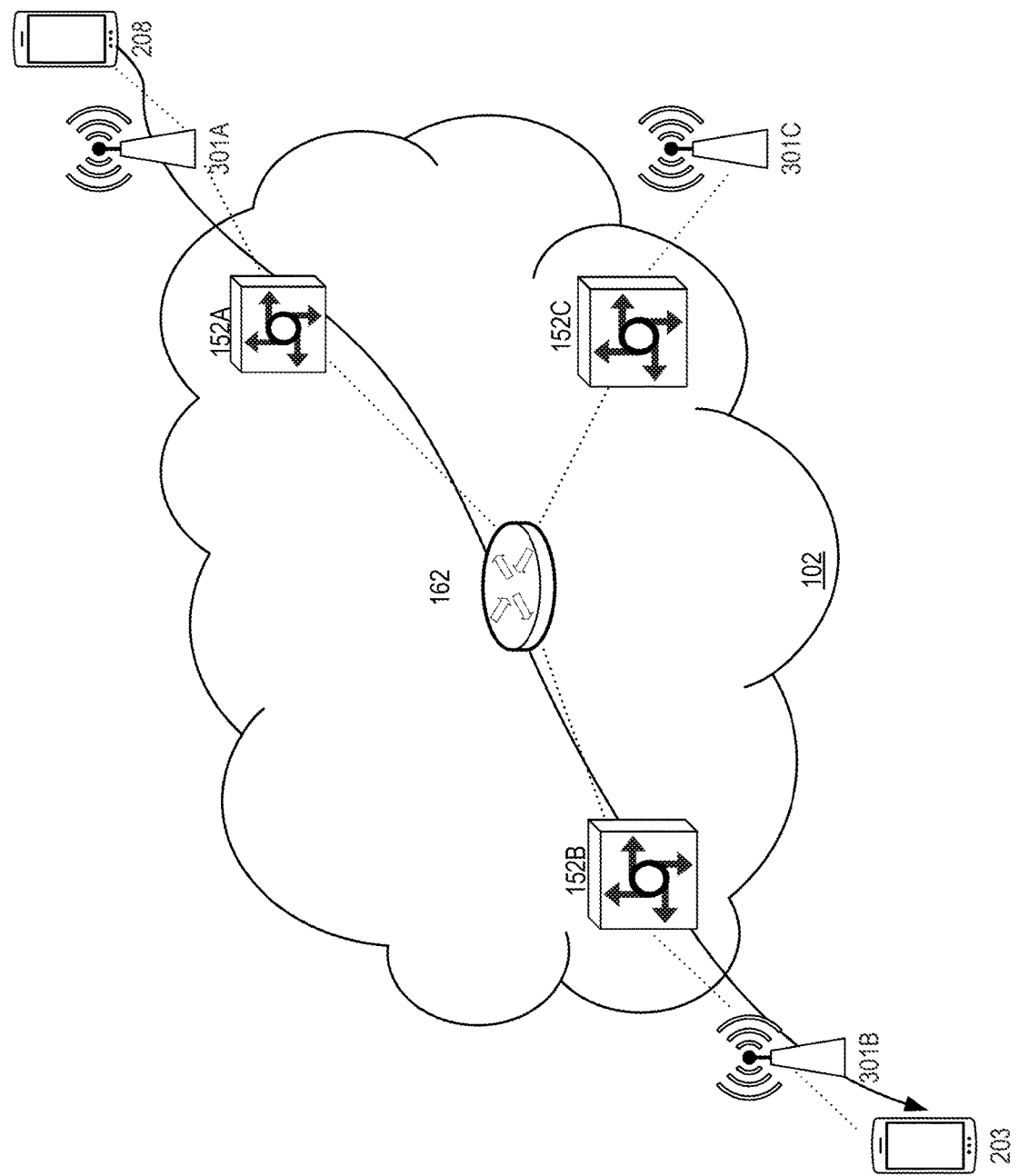
FIG. 2 illustrates a data flow for a content object returned from a producer to a consumer.

FIGS. 2-5 illustrate a first use of the FLs associated with content objects to support consumer mobility between PoAs. FIG. 2 illustrates a route from a user device 208 operating as a producer to a user device 203 operating as a consumer. In FIG. 2, it may be assumed that user device 203 has issued an interest request for named content that may be provided by user device 208. In FIG. 2, managers 104 are omitted for clarity. In FIG. 2, routers 152A-152C act as PoAs coupled to access points or base stations 301A-301C.

Figure 3:
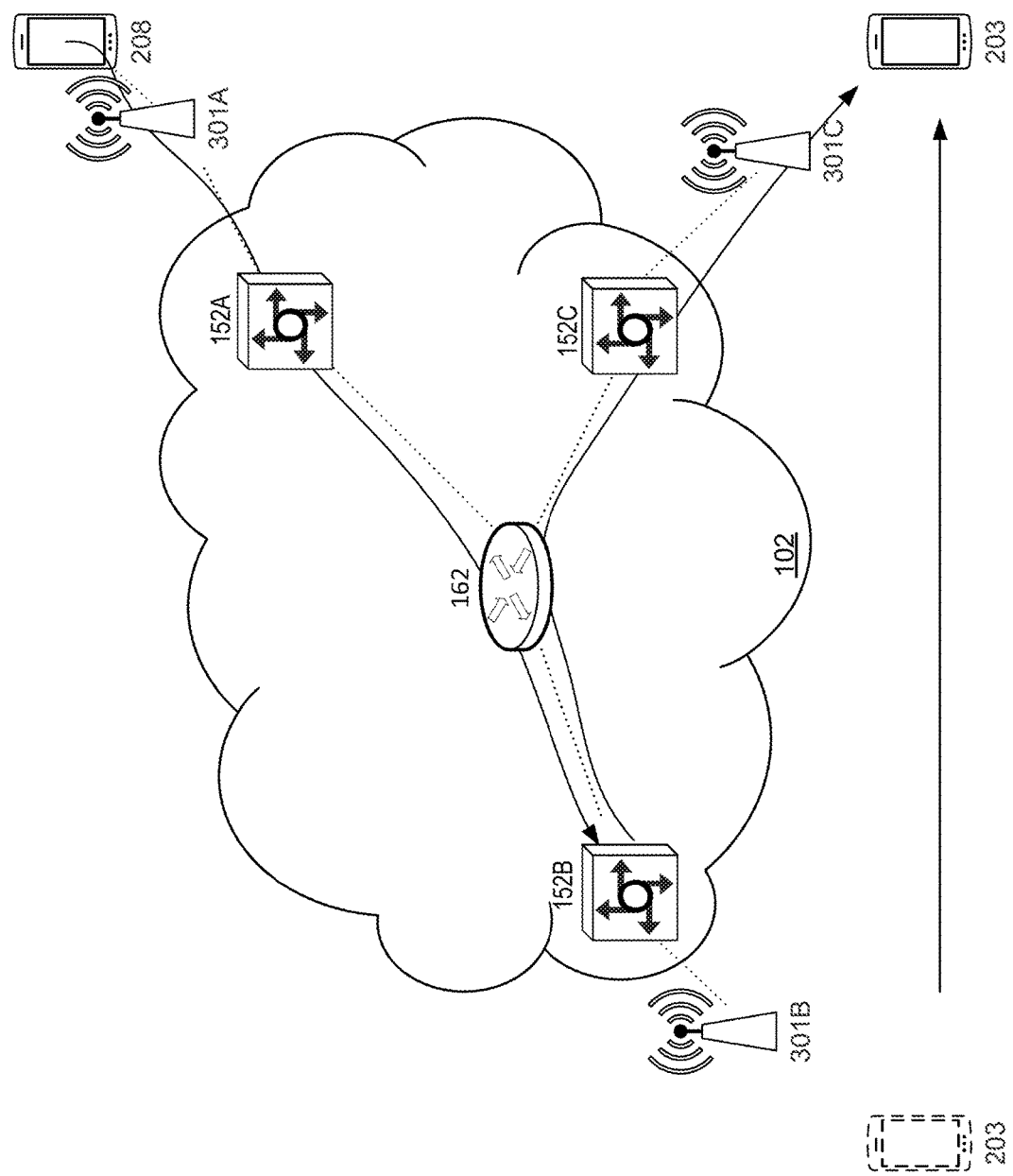
FIG. 3 illustrates data flows for a content object returned from a producer to a consumer where the consumer device has moved to a new PoA.

In FIGS. 2-3, user device 203 is initially connected to PoA 152B and access point 301B. In FIG. 3, due to, for example, physical movement of the device 203, the device will connect to a new PoA 152C and access point 301C. In the context of this disclosure, a PoA from which a user mobile device is moving away from may be referred to as an "old" PoA, while the PoA to which the user mobile, device moves may be referred to as the "new" PoA.

A conventional process for handling an interest message by a CCN/NDN protocol operates using, for example, a pending interest table (PIT). Each router 152A-152C may include a PIT, in addition to a content store, FIB, and ports. When an interest message is received on an ingress port of a router (in one example, PoA 152A), a lookup is performed in that router's content store. If a matching content object is found, it will be transmitted out of the ingress port as a response to the interest message. Multiple content objects may simultaneously match in which case the specification in the interest message will be used to determine which content object to return. When a match is found in the content store, processing stops and the interest message is discarded. If there is no match at the content store, a lookup may be performed in the PIT. If a matching interest message is found in PIT, an equivalent interest message has already been forwarded (to, for example, the producer user device 208) and is pending. The ingress port of the new interest message is added to the list of sources of unsatisfied interests in the PIT and the interest message is discarded. If there is no match at the PIT, a lookup is performed in the FIB. If a matching prefix is found in FIB, an entry is created in PIT identifying the ingress port of the interest message and the message is transmitted according to the strategy rules to one or more of the outbound ports registered for the prefix in the FIB. A PIT entry may also include the egress port or ports over which the interest is forwarded. If no match is found in the previous steps, then the node has no way to satisfy the interest message at present. The interest message may be held for a short time before being discarded, and the creation of a new entry may provide a way to satisfy the interest message.

An issue arises when a mobile device, such as device 203, moves from one PoA, such as PoA 152B, to another PoA such as PoA 152C. When a consumer device moves from one PoA to another, an interest expressed by an application on that consumer device times out and will be re-expressed at the new PoA in order for the content object to be redirected to the new PoA. Alternatively, the user device can re-express the interest request when it realizes that's one of its faces is inactive. This requires finding all affected interests requested via the face in the user device. Such operations can occur over a time period of seconds, which is problematic in a mobile environment.

After expression, in the best-case scenario, the consumer device receives content from an intersection router, such as router 162, between the old PoA-to-producer path and the new PoA-to-producer path. In the worst-case scenario, the consumer has to fetch content from the original producer, which could be many switches and routing hops away.

The technology disclosed herein achieves better performance in user device mobility between PoAs using a FL associated with content objects.

In the present technology, each user device acting as a consumer device utilizes a unique identifier, referred to herein as a consumer ID, and registers its consumer ID with the PoA to which it is attached. This registration is a local registration for the particular router acting as the point of attachment. In one embodiment, a device ID unique to the device can act as a consumer ID. The consumer ID is persistent, but only has significance between the PoA and the consumer user device. In another embodiment, discussed below with respect to FIG. 7, the consumer ID may be included with the content object.

The FLT table is used to map the consumer ID to the face and a FL. FLT can be used to handle producer mobility, we use it here to handle consumer mobility. As such, device ID can be logically separated into a consumer ID and producer ID within the same FLT data structure. The consumer PoA includes an FLT record storing the state of the face as active or inactive, and if inactive, the FL can be associated with a content object so that the content object is forwarded to the new PoA. Thus, the FLT cache table can be used for both producer and consumer mobility without the introduction of new data structures.

In one embodiment, a FL appended to a content object which is forwarded to a new PoA when a device moves to the new PoA does not include the CID. In alternative embodiment, the FL appended to a content object may include the CID when the content object is forwarded to the new PoA. In this context, PoA 152B is the "old" PoA from which the mobile device
is moving away from.

Figure 4:
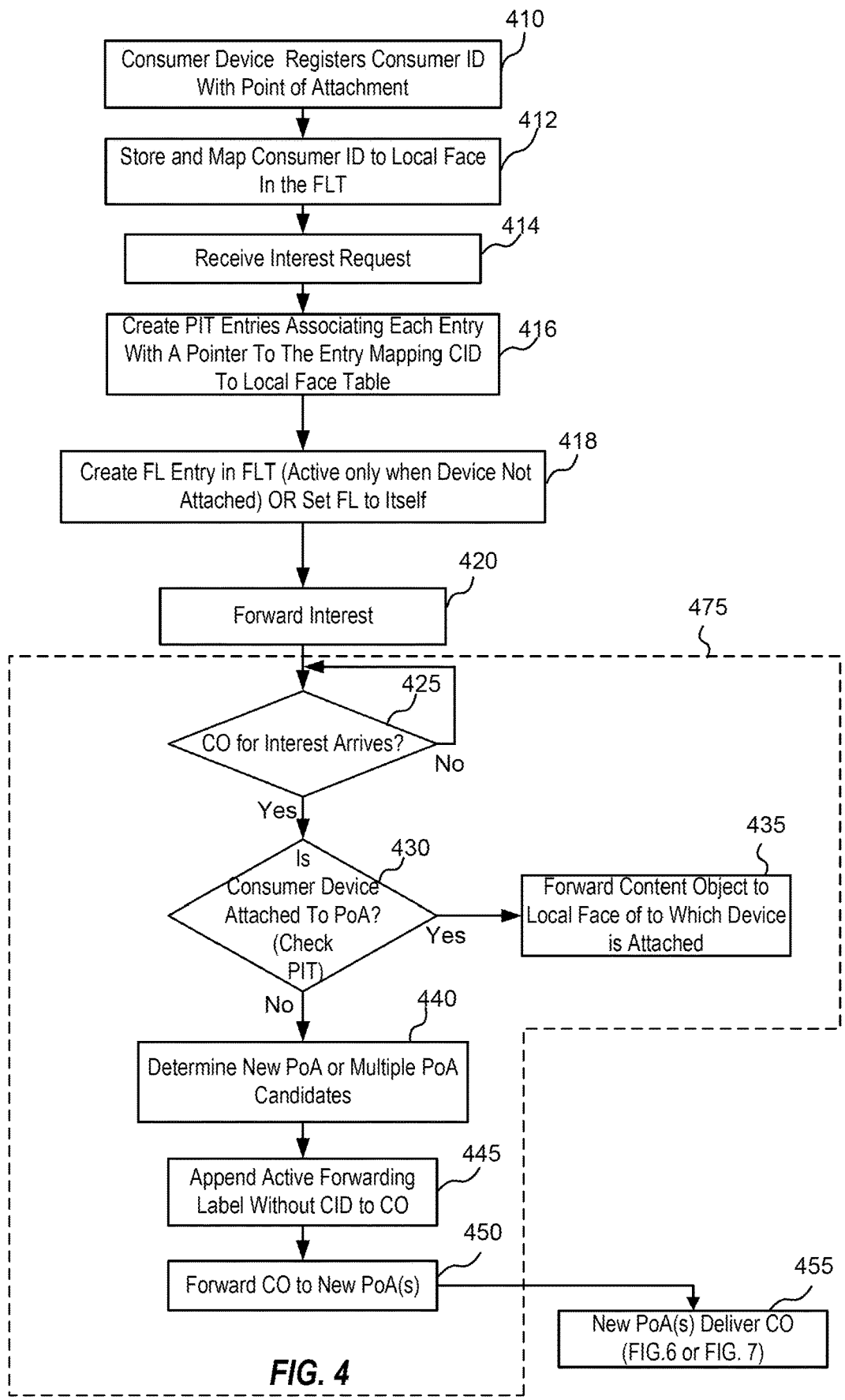
FIG. 4 illustrates a method for using FLs attached to content objects to improve consumer mobility.

FIG. 4 is a flowchart illustrating a process performed by a PoA (such as PoA 152B) to which a user device (such as user device 203) is connected. With reference to FIG. 4, at 410, a user device such as user device 203 will register its consumer ID with a PoA (such as PoA 152B) when it attaches to that PoA. The registration of the consumer ID is local to the PoA and in this embodiment, is not transmitted with any content objects to other PoAs. At 412, the consumer ID will be mapped to the local face of the PoA in the FLT, and stored in that device's PIT. At 412, multiple consumer IDs may be mapped to a local face such that each PIT entry may have a set of consumer IDs. At 414, the PoA will receive an interest request from the user device. The interest request identifies a service or data sought by the consumer processing device. At 416, the PoA will create PIT table entries associating each entry with a pointer to the entry mapping the (previously mapped) consumer ID and (optionally) to the local faces, thereby creating a record mapping the consumer ID to an interest in the PIT. At 418, a FL entry is created in the FLT cache table (examples of which are illustrated in FIG. 5). In one embodiment, the FL entry is only valid if the consumer processing device has moved to another PoA. Alternatively, at 418, the FL may be set to itself. In this alternative, when the content is returned to the PoA (from the provider), a check of the FL found to be pointing to itself indicates that the consumer has not moved to another PoA. In another embodiment, the creation of the FL entry in the FLT may occur after step 430, below, where the determination is made as to whether the consumer device is attached to the PoA has determined that the face is inactive, creating an active FL entry. At 420, the interest request is forwarded to the producer processing device.

At 425, when a content object responsive to an interest request arrives, a determination is made at 430 as to whether or not the consumer user device is attached to the PoA. Step 425 may be performed for each consumer ID mapped to the PIT entry (see FIG. 5, reference no. 408, below). As a result of this check, some consumers may still be attached while others may have moved. If a consumer is still attached, a content object for that consumer forwarded to the face to which the user device 203 is attached at 435.

If the consumer device 203 (associated with the consumer ID) has moved, as illustrated in FIG. 3, the content object can be forwarded along the path from PoA 152B via router 162 to the new PoA 152C that device 203 will connect to (i.e. the new PoA).

Figure 6:
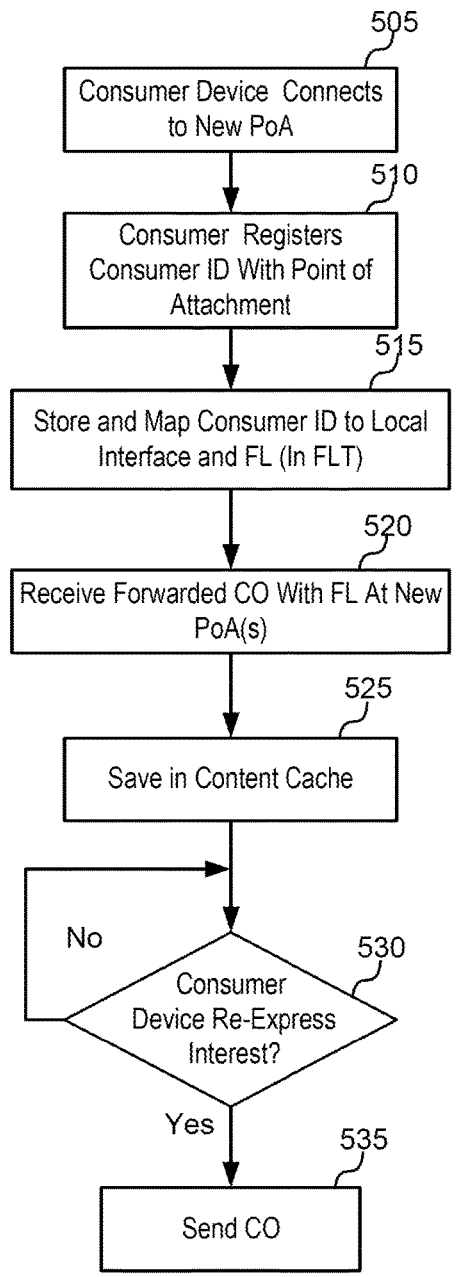
FIG. 6 illustrates a method for performed at a PoA to which a consumer device has attached.
Figure 7:
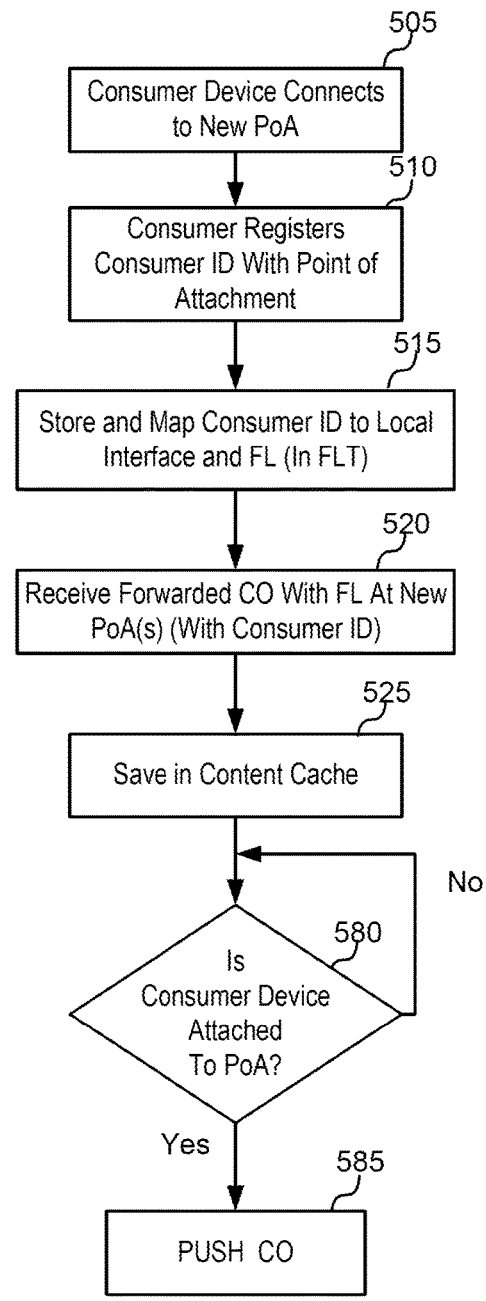
FIG. 7 illustrates another method for performed at a PoA to which a consumer device has attached.

If the consumer device has moved and is thus not connected to the PoA at 430, then a determination of a new PoA or multiple PoA candidates is made at 440. A determination of one or more new PoAs can be made using network based mobility, where the new PoA information is pushed from the network to the user device. At 445, a FL including the new PoA is appended to the content object and at 450 the content object is forwarded to the new PoA. In another alternative, the content object with each FL is replicated to multiple PoA candidates to which the consumer is likely to be attached. The new PoA or PoAs then deliver in the content object, as illustrated in FIGS. 6 and 7.

FIG. 5 illustrates one embodiment of a PIT and the FLT cache table. As illustrated in FIG. 5, the FLT cache table 410 includes an active FL record 402 indicating that the face to which a consumer device (C-ID-2) is no longer active and (in this example) the new PoA is POA-2. Another record 404 indicates that a consumer device C-ID-3 is active, but since the record points to itself, this indicates that the consumer processing device has not moved to another PoA.

Also shown in FIG. 5 is the PIT table 420 having multiple rows. One such row 406 illustrates an interest name (/producer/path/name1) mapped to a single consumer ID (C-ID-1), while a second row 408 illustrates an interest name (/producer/path/name4) mapped to a set of consumer IDs (C-ID-4, C-ID-5, . . . C-ID-N).

Hence, if the user device 203 has moved to a new PoA, as illustrated in FIG. 3, the content object will reach PoA 152B, have the FL appended to the content object, and rerouted to PoA 152C.

Thus, the content object for the interest request originally expressed by device 203 at PoA 152B will reach PoA 152C more quickly than were the interest request re-expressed at PoA 152C and the request routed back to the original producer device 208.

In another aspect, one or more of content objects forwarded by an "old" PoA (i.e. PoA 152B in the above example) are marked, so that the core routers 162 treat such objects differently from other, regular types of returning content objects. In this aspect, when an intermediate router (i.e. router 162) receives a marked content object, such objects are not matched against the content store, but simply forwarded using the FIB. Alternately, a determination can be made as to whether such a marked content object is in the content store and, if it is, the marked content object is simply forwarded, or it can be cached and forwarded.

FIGS. 6 and 7 illustrated two processes performed at the new PoA (for example 152C in FIGS. 2 and 3) to which a consumer processing device has moved (from, for example, the PoA executing the process illustrated in FIG. 4).

FIG. 6 illustrates a process performed at the new PoA, (such as PoA 152C in FIG. 3,) when the user device (user device 203) attaches to this new PoA. At 505, the user device connects to the new PoA. At 510, the user device registers its consumer ID with the new PoA. At 515, the PoA stores and maps the consumer ID to the local face in the FL table in the manner that the original PoA did in step 415. (Again, an exemplary data structure is shown in FIG. 5.) At 520, the new PoA will receive the forwarded content object with the attached FL. At 525, the content object is stored in the PoA content store until, at 530, the consuming user device re-expresses its interest request. Once it does, the content object can be forwarded to the consumer device.

FIG. 7 illustrates another process which may be performed at the new PoA. The method of FIG. 7 has a number of similar steps to those shown in FIG. 6 and such steps have similar reference numbers. A description of such steps will not be repeated and it will be understood that similarly numbered steps in each FIG. are the same.

In the embodiment of FIG. 7, instead of waiting for the consumer device to re-express its interest in the content object at 530, the content object may be "pushed" to device at the new PoA. One difference is that at step 520, when the new PoA receives a forwarded content object form the old PoA, the content object will contain the consumer ID (in the FL). Instead of waiting at 530 (as in FIG. 6), at 580, a determination is made as to whether not the user device has attached to the new PoA. If so, then at 585, the content object is pushed to the consumer device. In this alternative, the consumer ID is appended to the content object along with the FL to allow that the consumer ID to be matched with the registered consumer ID in the new PoAs FLT table. These forwarded content objects are identified distinctly in the forwarding plane, so that core nodes forward them based on the FL at address rather than the PIT recorded path.

Thus ICN routers acting as core routers, such as router 162, will see two types of content objects: content objects that are sent in response to interest requests from devices, and re-forwarded, FL appended content objects which are processed in accordance with the present technology.

In another embodiment, any content object having a FL can be cached at the core router with the FL removed if there is no prior cached copy of it in the content store 110 of a core router (such as router 162).

It should be recognized that although the term consumer has been used in the above description, the same technology can be used for producers. It should be further recognized when that when interest requests arrive, the interests are associated with a consumer ID which may be saved in the PIT entry as well. The PIT may be modified to store the consumer ID along with the interest name entity. The consumer ID is only a local record on the PoA. As the mobility is applied to the device, the consumer ID can have a device ID scope and be inserted by the user device. Interests may be forwarded beyond the PoA and will not carry any consumer ID.

It should be also noted that where the FL includes more than one PoA (i.e. a set of candidate points of attachment), the received content object can be broadcast from the original PoA (152B, for example) to all candidate PoAs. The mapping of the consumer ID to the FL is based on the mechanism of network-based mobility, where the new PoA information is pushed from the network to the user device. As soon as the handoff signaling is received from the network mobility infrastructure, the PoA can update the FLT entry for the consumer ID with new FL information.

Figure 8:
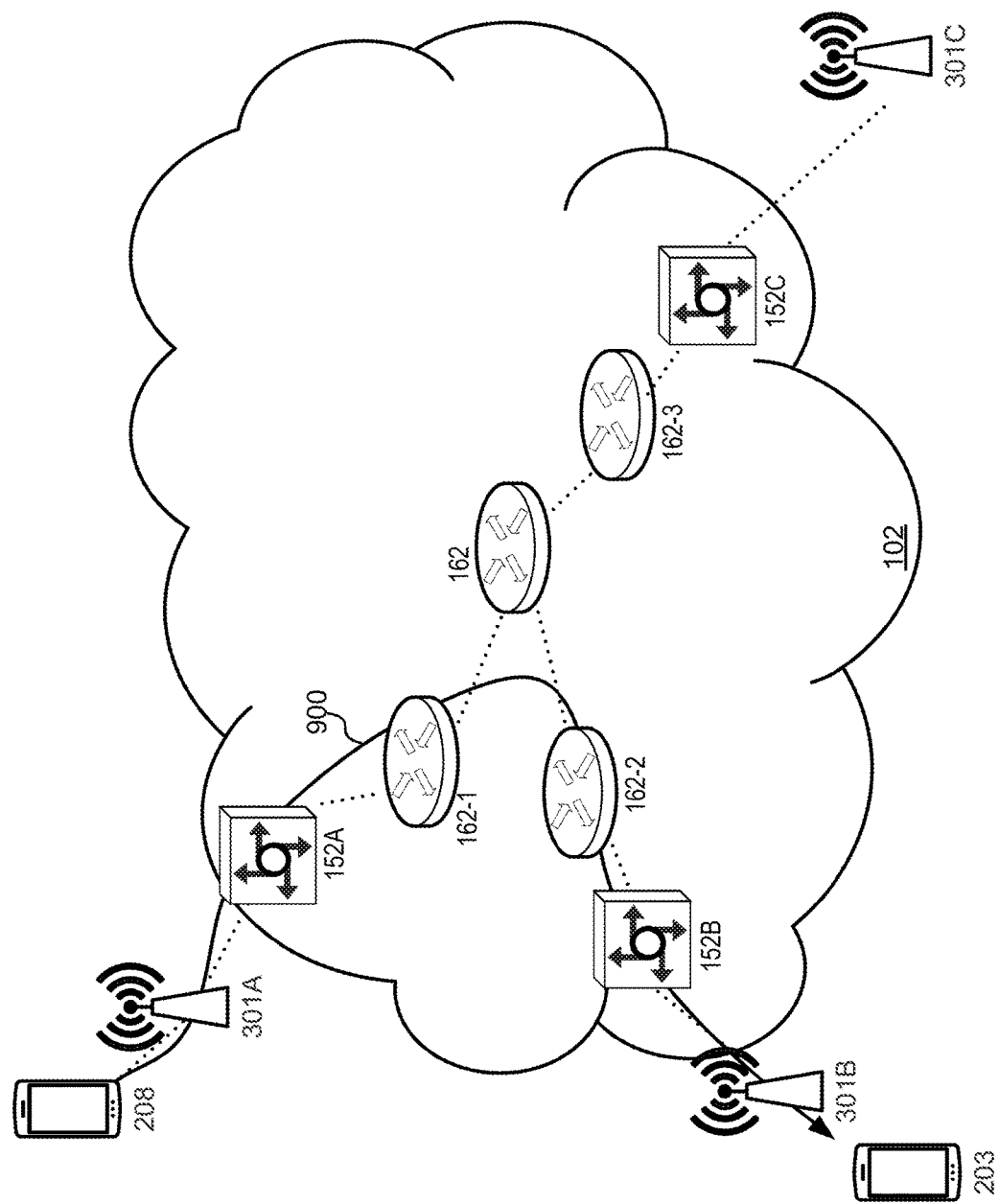
FIG. 8 illustrates another data flow for a content object returned from a producer to a consumer.
Figure 9:
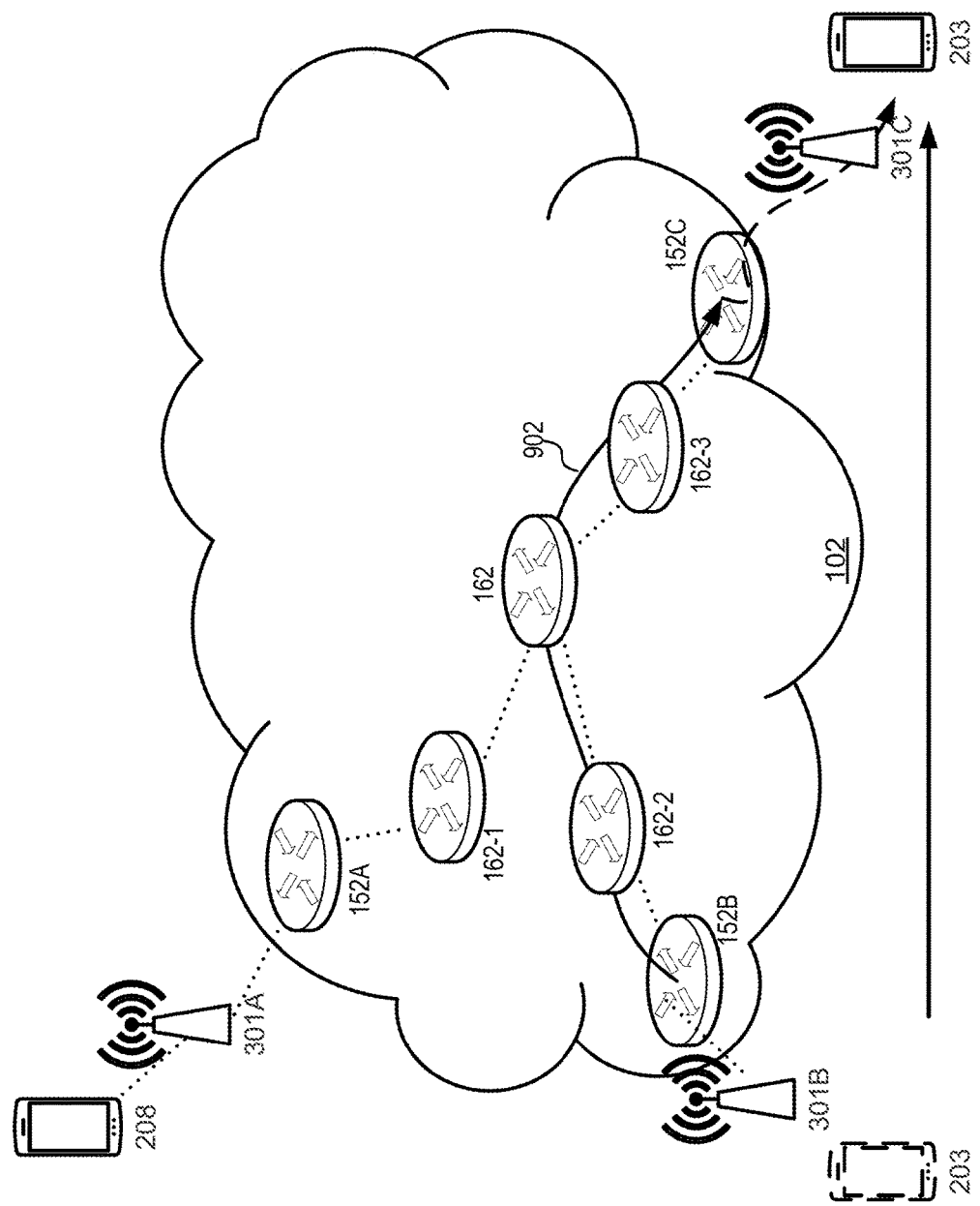
FIG. 9 illustrates another data flow from a first PoA to a new PoA to which a consumer device has attached.
Figure 10:
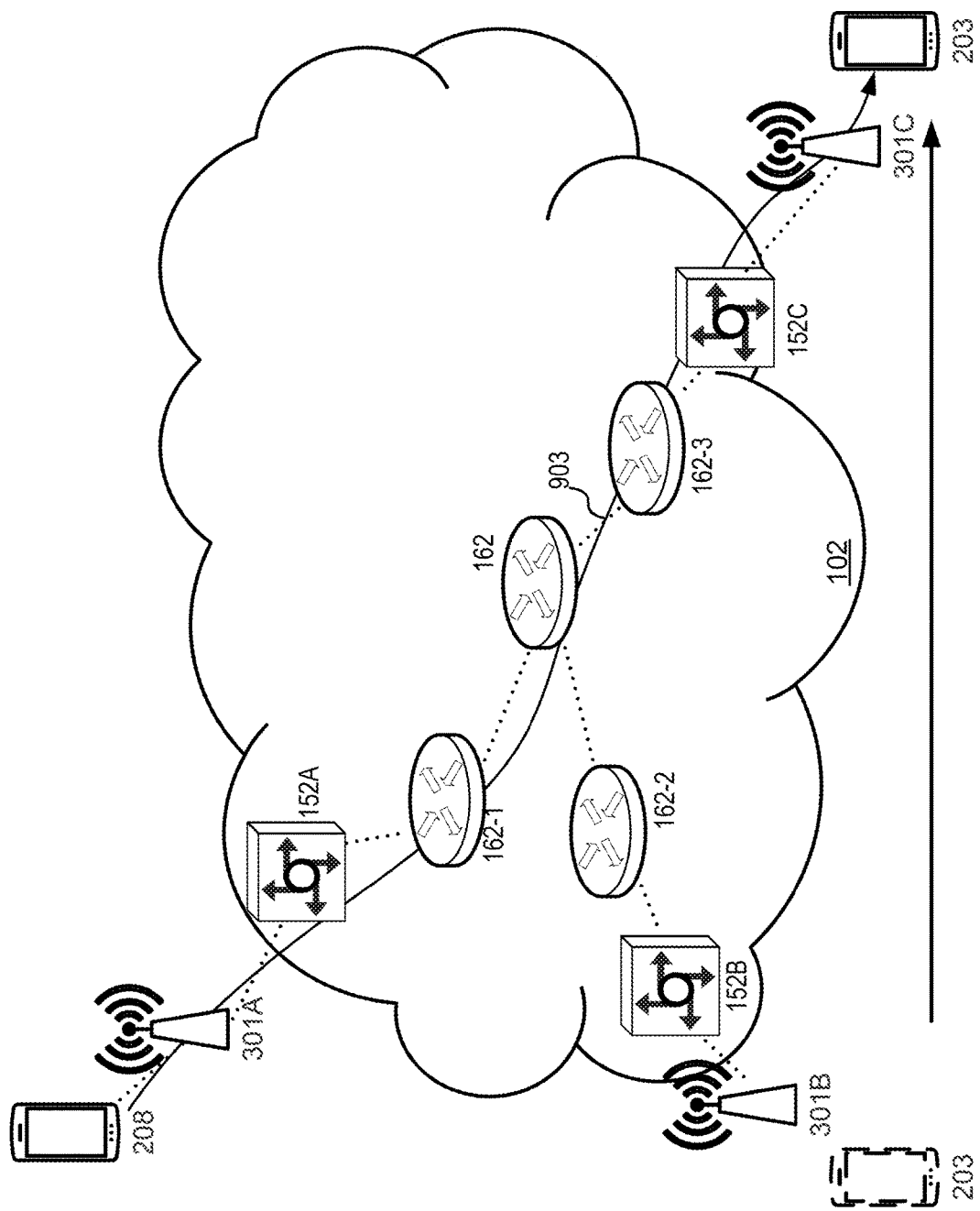
FIG. 10 illustrates a new data flow for content objects from the producer to the consumer in the embodiment of FIG. 8.

Another approach to improving consumer mobility using forwarding labels is illustrated with respect to FIGS. 8-11. In this approach, management of interests in each PIT in each intermediate router occurs. In the ICN 102 illustrated in FIG. 8-10, additional ICN routers 162-1 to 162-3 are illustrated. In FIG. 8, consumer device 203 is attached to PoA 152B. Device 203 moves (FIG. 9) to PoA 152C. As illustrated in FIG. 10, the most efficient route for a returning content object to reach device 203 when attached to PoA 152C is via route 903. The intermediate routers 162-1, 162 and 162-3 can be configured to perform this routing.

With reference to FIG. 8, the first PoA 152B may have PIT entries mapped to both interest name and consumer ID which may be kept in different memory blocks.

With reference to FIG. 9, when a deregistration request is received by PoA 152B with an accompanying consumer ID, requests can be extracted from PoA 152B's PIT and forwarded along path 902 using a FL pointing to the new PoA 152C. At each hop (in this example 162-2, 162, 162-3,) the FL is looked up to obtain the face information at the router, and any existing PIT entry in each such router may be updated with the new PoA destination (FL), depending on where the proactive interests are forwarded to (such as, to a router with no matching PIT entry, to a branching point, or to a router that carries an existing entry). After the entries are updated accordingly, data packets will then follow path 903 (FIG. 10) to reach the consumer device connected to PoA 152C. Another approach would be to not have any FL state information in the routers in the path between the old POA and a branching point router, and in this embodiment, the CO will be re-routed from the old POA based on the FLT state.

In this embodiment, when a router receives an interest, it creates a name-based PIT entry along with FL information. In the nodes where there are no prior interests (such as router 162-2), entirely new entries are created, with the face corresponding in the PIT entry pointing to the outgoing face of the FL. If there are multiple FLs, then the new entry will include multiple incoming face information corresponding to each of the FL item. This will enable the CO to be eventually replicated to multiple potential POA nodes where the processing device will be connected. When the re-directed PIT entry interests reach the new PoA (152C), new PIT entries are created so that the returned objects can be identified and cached for later consumption. A returning content object may in some cases have consumed the PIT entry, in which case the proactive interest is dropped, as the content object would have gone to one of the downstream nodes from the current node, and would have been redirected.

Figure 11:
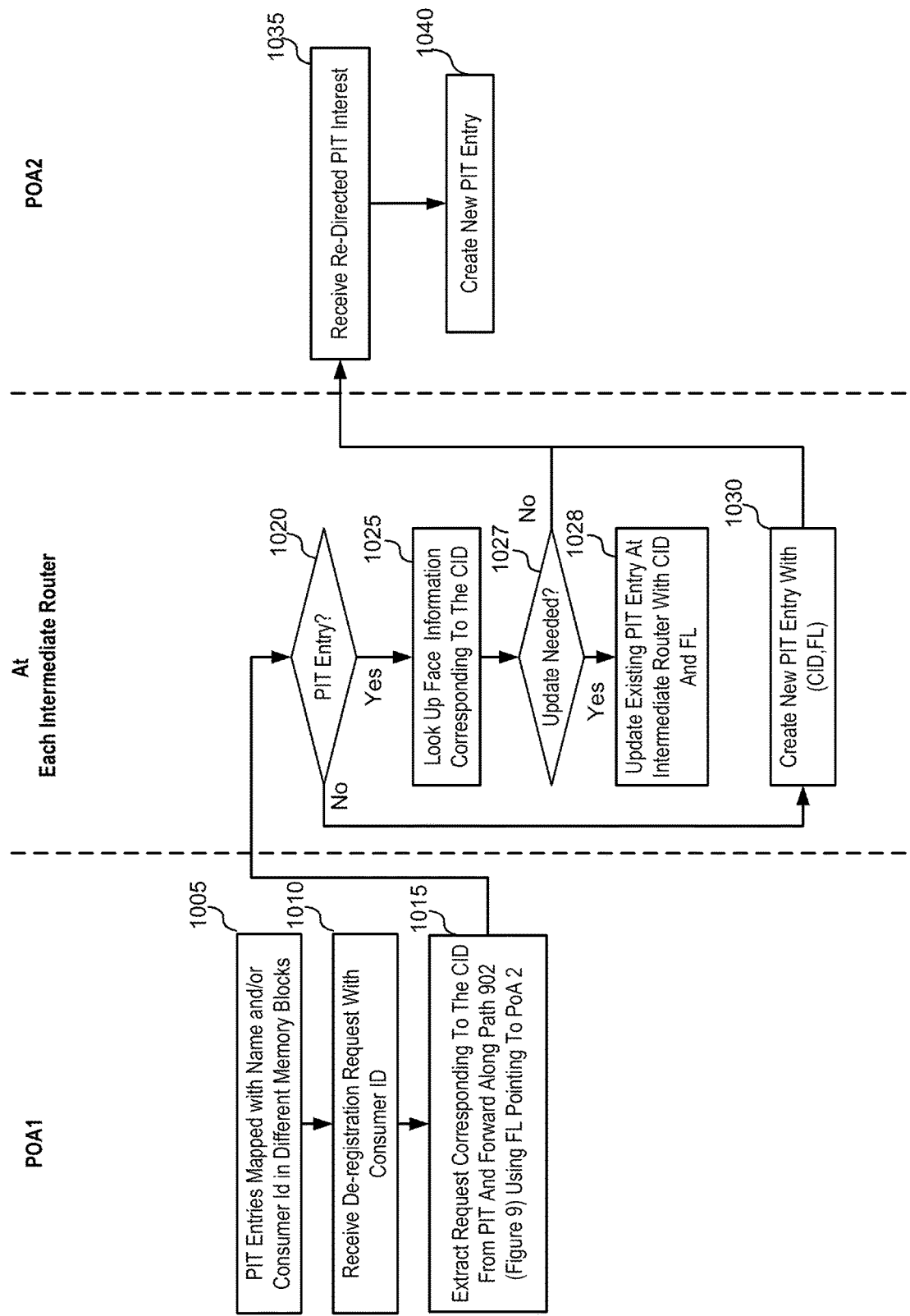
FIG. 11 illustrates processes performed at each of a first PoA, a second PoA and intermediate routers between the first PoA and second PoA.

FIG. 11 is a flowchart illustrating various steps at each entity reflecting the embodiment of FIGS. 8-10. The flowchart illustrates steps performed at a first PoA (PoA1, such as PoA 152B), a new PoA (PoA2, such as PoA 152C) and each intermediate router between them (including routers 162, and 162-1 to 162-3 in FIGS. 8-10).

At 1005, PIT entries are mapped with the name and/or consumer ID in different memory blocks in PoA1. The memory block structure is illustrated in FIG. 12. When a de-registration request is received by the PoA (152B) at 1010, the request(s) corresponding to the consumer ID is (are) extracted from the PIT and forwarded to each intermediate router (along path 902 to in FIG. 9) using one or more FL pointing to PoA2 or other potential POAs at 1015. Also, as in the previous embodiment, the interests can also be forwarded to a set of PoAs by updating the FL list to include multiple forwarding labels. (FL1, FL2 . . . ). In another implementation, the FL state needn't be updated in the routers which already has the PIT entry, except in a branching router. A branching router is identified by comparing whether the outgoing face of the FL is different from the current outgoing face over which the original interest was forwarded. If the PIT entry in the intermediate router has the FL state, and the content object is received, the PIT entry in a given core router is removed after appending the list of FL to the content object and forwarding it out. In order to ensure the CO is made available to the set of end points still connected to the old POA, a copy of the CO should be send out on the face corresponding to the original PIT entry directing at the old POA. In the core routers with no existing PIT entry, only new entries are created with appropriate face state (multiple if there are multiple FLs in the proactive interest)

At each intermediate router, at 1020, a determination is made as to whether not a PIT entry exists for the interest at that router. If an interest exists in the PIT table, at 1025, the intermediate router looks up the face information. At 1027, a determination is made as to whether the existing entry needs to be updated and if so, the router updates its existing PIT with the new PoA (PoA2) based on the FL information at 1028. If no update is needed at 1027, no change to the entry is maek. If no entry exists at 1020, then a new pit entry is created at 1030 in the router, with the new entry in the router identifying the interest in record (e.g. the PIT entry of FIG. 5).

At 1035, in the new PoA, the re-directed pit interest is received. A new PIT entry is created at 1040 and the process of determining whether the content object has arrived and the consumer device is attached (steps 475) can then proceed in accordance with the foregoing description.

Also in PoA2, any new re-expressed interest should contain the consumer-ID along with the FLs. This allows creation of a corresponding state can be created in the ID-PIT/NAME-PIT table at that at the destination POA (PoA2).

Figure 12A:
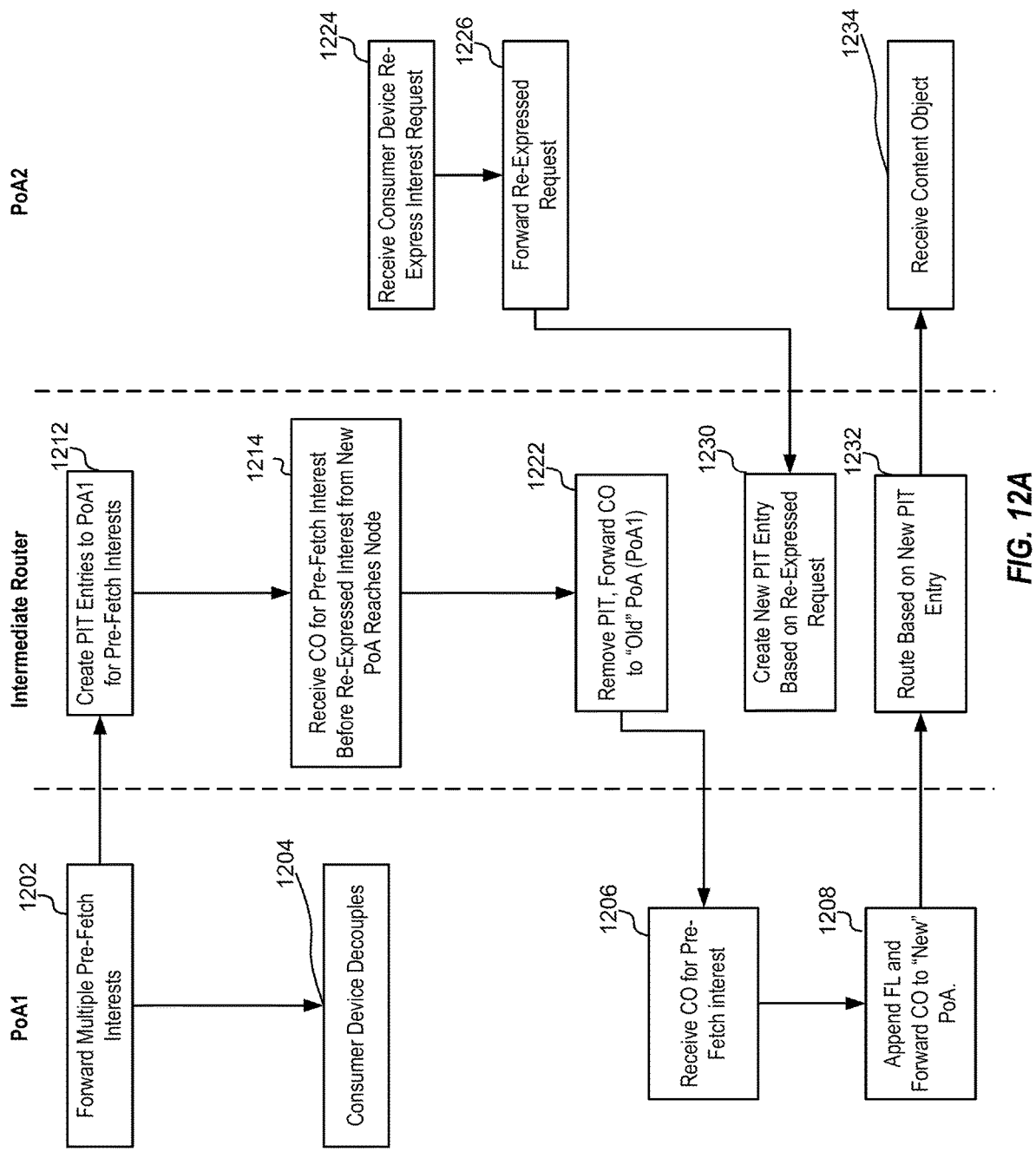
FIG. 12A illustrates a processes performed at each of a consumer PoA, a producer PoA and intermediate routers between the consumer PoA and producer PoA where a content object arrives at an intermediate router before a re-expressed interest from a moved processing device.
Figure 12B:
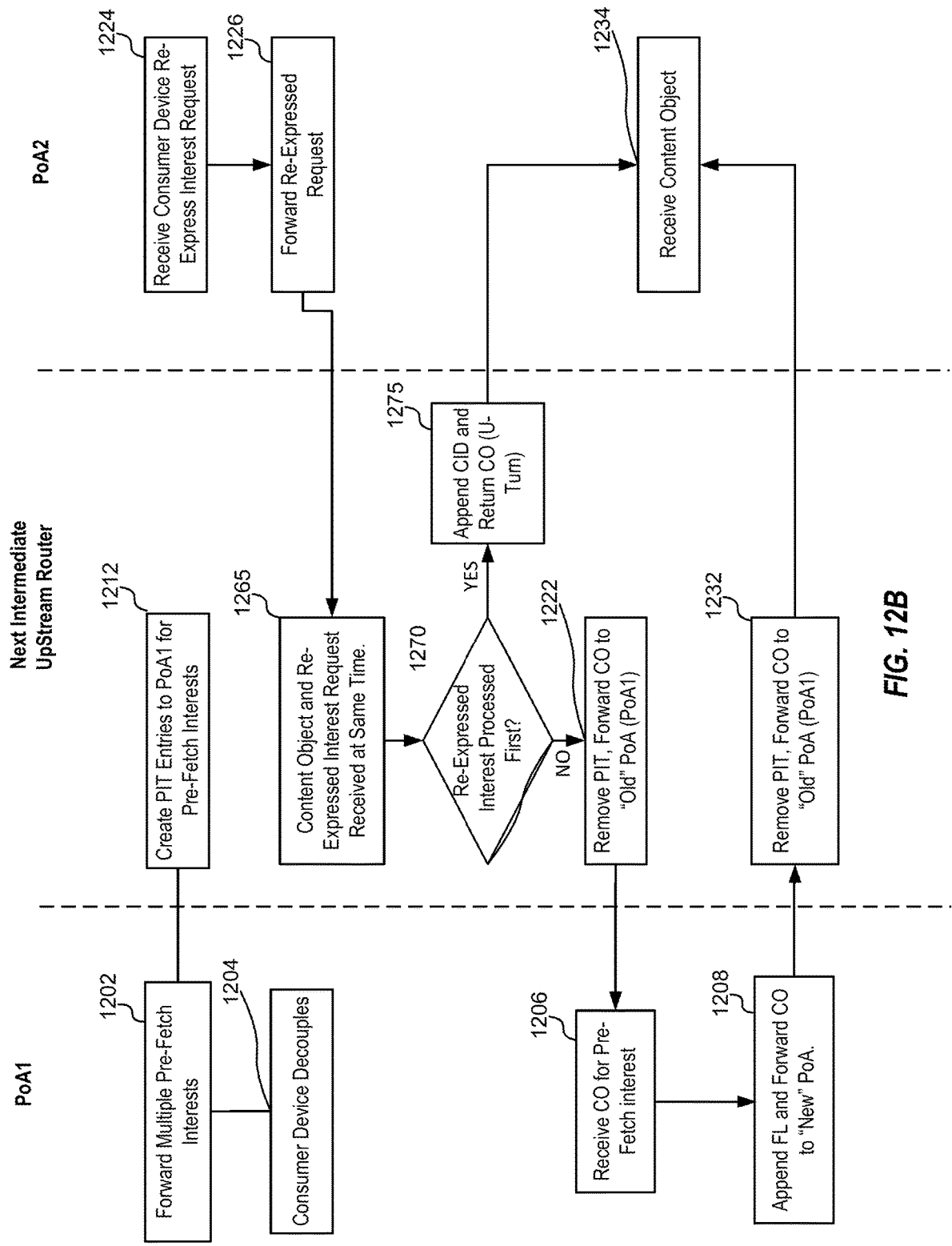
FIG. 12B illustrates a processes performed at each of a consumer PoA, a producer PoA and intermediate routers between the consumer PoA and producer PoA where a content object arrives at an intermediate router at nearly the same time as a re-expressed interest from a moved processing device.

FIGS. 12A and 12B illustrate two scenarios which may exist in the embodiment of FIGS. 8-11 with respect to pre-fetch interests where content objects may be received by upstream routers in an ICN before a proactive interest request is received by the router.

Pre-fetch interests are requests made by a consumer device before a content object may be available. One example of this are pre-fetch interest request made for a video chat application. In a video chat application, a consumer may issue a number of pre-fetch interests in order to ensure than the stream of data flowing between the two devices is consistent. This may result in a unique situation where a data packet can be forwarded by an upstream router before a pre-fetch interest is received by the router because content objects for the consumer are being constantly created.

Using the routing information in the FL from the original consumer PoA, each intermediate router can choose to re-route pre-fetch interest based on the fact that they are pre-fetch interest.

FIGS. 12A and 12B illustrate two cases which may occur with respect to pre-fetch interest and content objects associated with pre-fetch interests. With reference to FIG. 12A, at 1202, PoA1 may forward multiple pre-fetch interests to each of the upstream routers (such as 162, 162-1, 162-2 In FIG. 10) in order to set up its initial object route (900) for data associated with those interests. In the next upstream router, PIT entries are created based on those interests at 1212.

When a mobile device moves, it is possible that a content object associated with a pre-fetch interest may be received before the re-expressed interest from the new PoA reaches that node. In such cases, the PIT entry is removed as usual and the content object is sent downstream toward the "old" PoA where it is appended with the FL and resent out to the "new" PoA. This scenario is illustrated in FIG. 12A.

When the consumer device decouples from PoA1 at 1204, it will move to PoA2 and may re-express its interests at 1224 (which were originally expressed at 1202). However, any of the intermediate routers (such as 162, 162-1, 162-2 In FIG.

10) may receive a content object at 1214 before the re-expressed interest (forwarded at 1226 following re-expression of the interest request at 1224 after the consumer device attaches to the new PoA) is received at the intermediate router. In this case, the intermediate router will remove the PIT entry and forward the CO to the "old" PoA, PoA1 at 1222. PoA1 will receive the content object at 1206 and append the FL (as in the above embodiment) and forward the CO to PoA2. The intermediate router will route the CO to the new PoA at 1232, which receives the CO at 1234.

In the aforementioned example, the technology can apply the previous solution of redirecting the content object to a new PoA with the FL identifying the new PoA. If this situation happens in any of the upstream nodes (that is, the content object is received before the redirection interest), the content object will be forwarded until it hits a downstream node where the PIT entry has the FL details, or else the content object will route all the way down to PoA1.

Notably, this situation may occur when a consumer device is moving from a PoA1 to a new PoA2. In this case, each upstream route may determine that any PIT entries associated with the consumer ID of the consumer device should be changed based on FL data.

As the content object is forwarded, each upstream router which has an existing PIT entry associated with the consumer ID can recognize the FL in the content object and correct any PIT entries on its own. Each intermediate router may also keep an extended PIT table with the consumer ID information similar to the POAs (i.e. entries similar to PIT 510 in FIG. 5). This allows each intermediate router to understand the context of the FL as it applies to a particular consumer-ID.

If any other consumer processing devices have expressed an interest for the CO and remain at the old PoA, the CO is also forwarded towards the old POA after applying the set of FL from the proactive interest signaling.

Another scenario occurs when both the CO and the proactive interests reach a node at the same (or nearly the same) time. If the re-expressed interest is processed before the content object, there is a state in the PIT to append the FL and return it.

In FIG. 12B, steps 1202, 1204, and 1212 are performed as in FIG. 12A. The consumer processing device re-expresses an interest request at 1224 and the request is forwarded at 1226. At 1265, the content object and the re-expressed interest request are received at the same time (or nearly the same time). If the re-expressed interest request is processed first as 1270, the FL with a consumer ID is appended and the content object returned to the new PoA at 1275. If not, then the PIT entry is removed and the content object forwarded to the old PoA where is it processed as described in FIG. 12A.

Figure 13A:
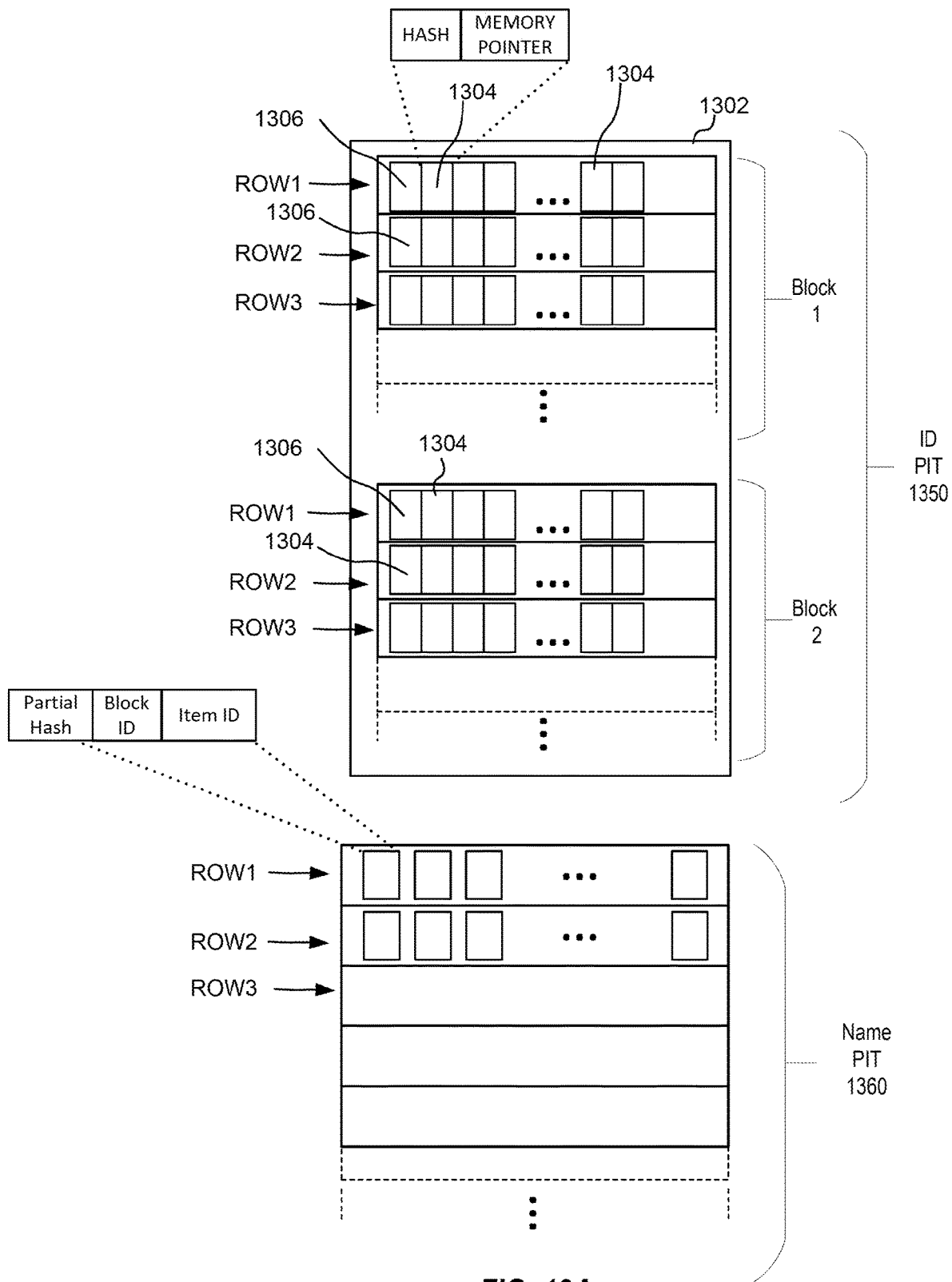
FIG. 13A illustrates data structures used in a PoA in accordance with the present technology.
Figure 13B:
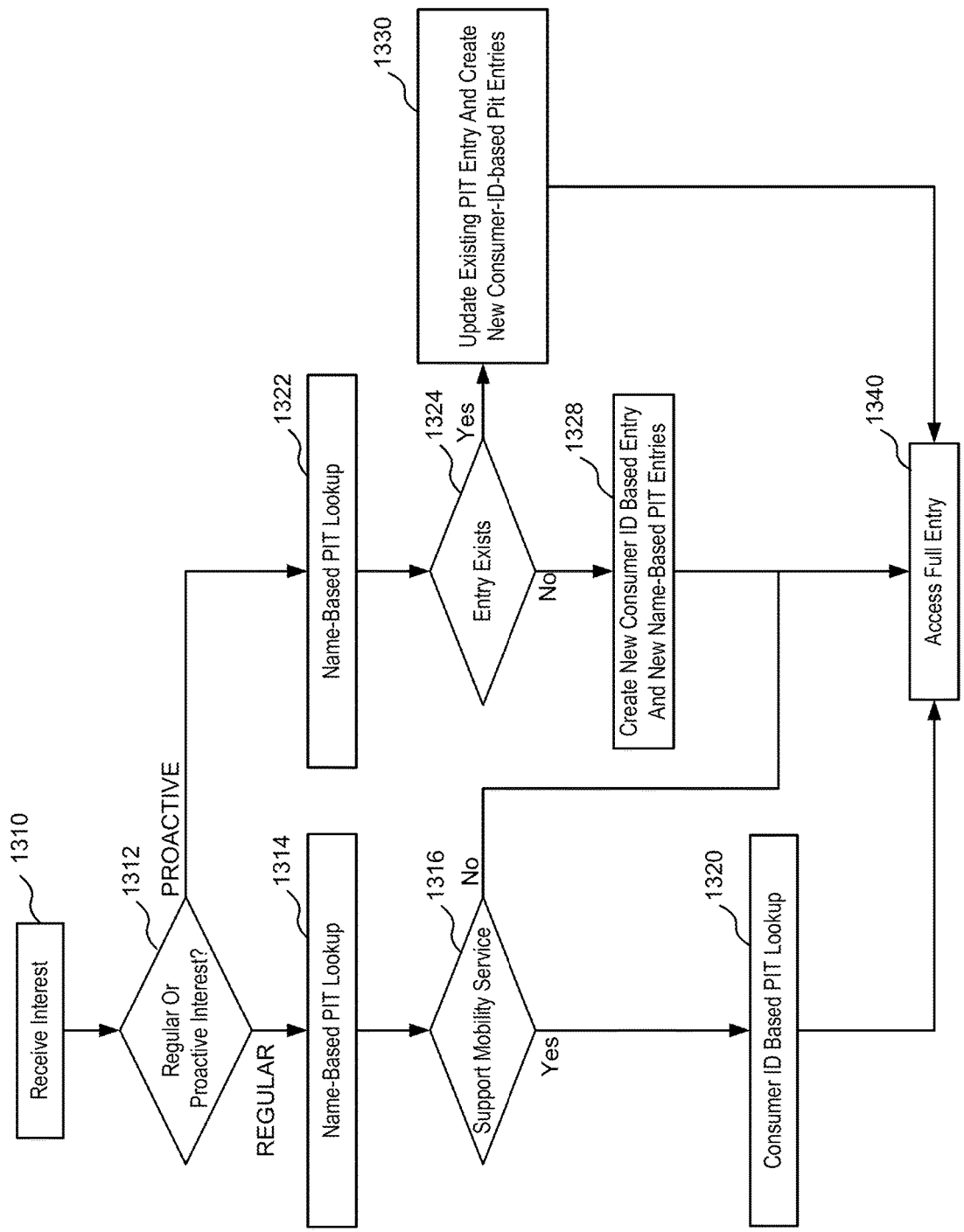
FIG. 13B illustrates a memory processing method utilized by routers and PoAs in the present technology

FIG. 13A is a block diagram of one example of a data structure used for the processes illustrated in FIGS. 11 and 12. The architecture of FIG. 13A may be utilized in a subset of mobile flows and may thus be provided as a service. FIG. 13B illustrates memory processing in one or more core routers and/or service routers and/or PoAs used to implement the technology discussed herein. The architecture of FIG. 13A can be utilized in a subset of mobile flows of the network 102.

As illustrated in FIG. 13A, an ID PIT 1350 and a name PIT 1360 are utilized. The ID PIT 1350 is organized into multiple memory blocks. In FIG. 13A, two blocks (BLOCK 1 and BLOCK 2) are illustrated. Each block has multiple memory rows. In FIG. 13A, rows 1-3 are illustrated and labeled, but it should be understood that many other rows are included in a block. Each block in the ID PIT includes a block ID, and an Item ID which is identified by a row number and a column number. The first entry in each row is a check bit array 1306 which indicates whether an entry is alive or dead (or, active or inactive). Each row includes multiple entries 1304, each of which includes a hash of the content name carried within an interest and a memory pointer to the name PIT.

The name PIT serves as a dual-purpose PIT which behaves differently depending on the type of request or the source of the request. For regular flows, a PIT entry in a row consists of a partial hash (derived from the hash of content name), and pointer to full PIT entry (which, for instance, includes the full content name, interface information, nonce, and timeout values). For mobile flows with mobility service enabled, a PIT entry in a row consists of a partial hash, and a block ID and Item ID couple, with the block ID and item ID being unique for each existing entry, representing a mapped entry within the ID PIT. Specifically, the item ID and block ID in the name PIT serve as an intermediary memory pointer to the name entry, with the actual pointer stored within the ID PIT entry. Hash-based lookups typically involve using a first part of the hash to find a bucket of entries and a second portion of the hash for validation, by going over the stored entries within. Each partial hash entry represents the validating, second portion of the hash; for instance, in a 64-bit hash, the first 28-bits can be used for lookup with the remaining 36-bits representing the partial hash for validation purposes. In one embodiment, each name PIT entry can include a single bit identifier on the type of entry stored.

FIG. 13B illustrates memory processing in one or more PoAs (or service routers) used to implement the technology discussed herein. (In other core routers, one can store proactive signaled FLs and consumer IDs as an extension to an existing, conventional PIT structure.) For PIT memory processing, there are four cases to consider in the above embodiments: a de-registration request; a regular, non-mobility supporting interest; a regular mobility supporting interest; and a proactive interest. A de-registration request is supported by the mobility service and will trigger accessing the ID-PIT to extract all the PIT entries generated by the consumer and creating a proactive interest (or proactive interests) towards the consumer's next location (PoA). A regular, non-mobility-supporting interest will either insert a new PIT entry or update an existing name PIT entry. A regular, mobility-supporting interest creates a new name-PIT entry or updating a current name PIT entry. In one embodiment, the service router may store another small table to map consumer IDs to assigned blocks, active block IDs and the latest item ID, which allows creation of another memory block, if necessary. A proactive interest may have no change or an update to the PIT depending on the type and location of the receiving router, and the implementation logic.

At 1310, an interest is received. At 1312, a determination is made as to whether the interest is a regular interest or a proactive interest. If the interest is a regular interest, then a name-based PIT lookup occurs at 1314 to associate the interest name with a consumer ID as above. Next, at 1316, a determination is made as to whether interest is supported by a mobility service. If not, at 1340, the full memory entry is accessed through memory pointer stored within name PIT entry. If the interest is supported by a mobility service at 1316, then a consumer ID-based PIT lookup occurs at 1320, and the full entry (FIG. 13A) is accessed at 1340 through memory pointer stored within ID PIT entry.

If, at 1312, the interest is a proactive interest, then a name-based PIT lookup occurs at 1322. If the entry or entries exist at 1324, then at 1330, the existing entry or entries are updated and new, consumer ID-based PIT entries are created. If no entry exists at 1324, a new consumer ID-based PIT entry is created as well as name-based PIT entries are created at 1328. Following creation of the entries at 1328 or updating at 1330, the full entry may be accessed at 1340 for further updates.

Figure 13C:
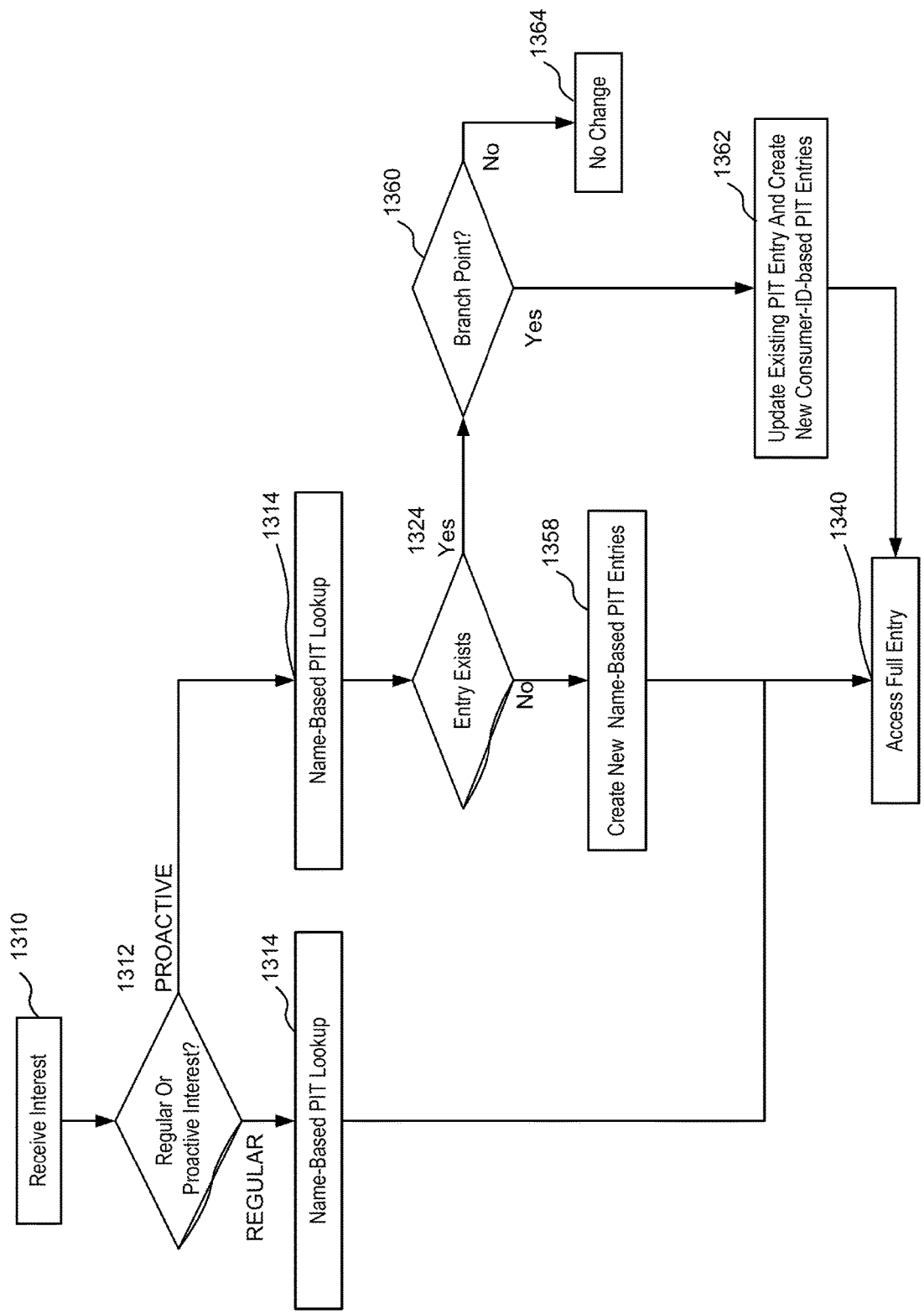
FIG. 13C illustrates memory processing in one or more intermediate forwarding routers used to implement the technology discussed herein.

FIG. 13C illustrates memory processing in one or more intermediate forwarding routers, which may or may not carry an ID-based PIT design, and which are used to implement the technology discussed herein. Similar steps have similar reference numbers relative to FIG. 13B.

At 1310, an interest is received. At 1312, a determination is made as to whether the interest is a regular interest or a proactive interest. If the interest is a regular interest, then a name-based PIT lookup occurs at 1314 to associate the interest name with an existing entry or to create a new entry, and the full entry can be accessed at 1340 for further updates.

If, at 1312, the interest is a proactive interest, then a name-based PIT lookup occurs at 1314 and a determination made whether an entry exists at 1324. If no entry exists at 1324, a new name-based PIT entry is created at 1358. Following creation of the entries at 1358, the full entry may be accessed at 1340 for further updates.

If an entry exits at 1324, then a determination is made as to whether the router is a branch point at 1360. A branch point is a router in the path between the source of the CO and the new and old PoAs (such as router 162 in FIGS. 9 and 10. If the router is not a branch point, then no change to the entry is made. If the router is a branch point at 1360, then the existing name-based PIT entry is updated and new, consumer ID-based PIT entries are created. The full entry may then be accessed at 1340.

Figure 14:
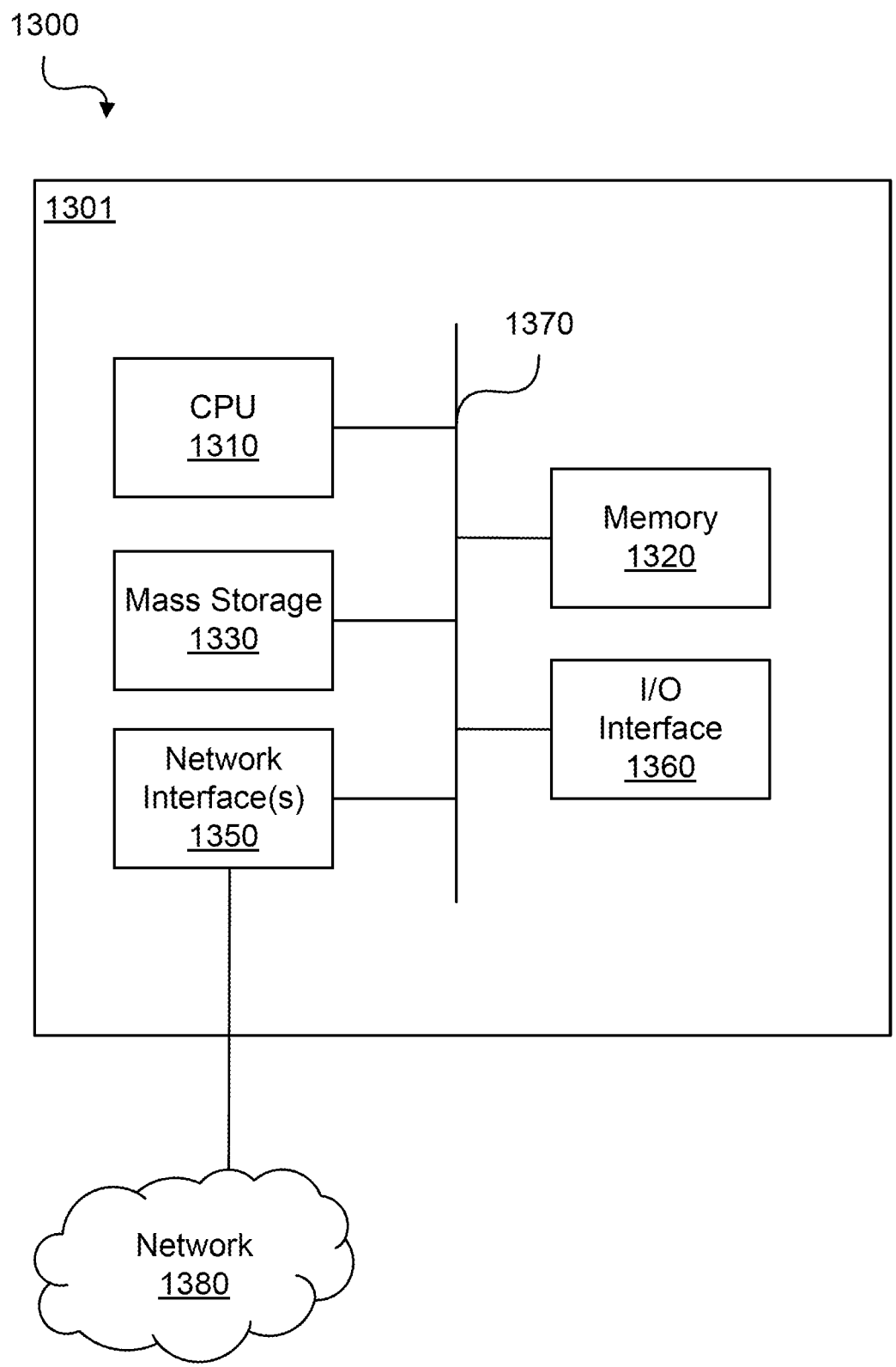
FIG. 14 is a block diagram illustrating a processing device.

FIG. 14 is a block diagram of a processing device 1300 that can be used to implement various embodiments of the consumer and provider processing devices, and routers. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1301 equipped with one or more input/output devices, such as network interfaces, storage interfaces, and the like. Each processing device may include multiple processing units. Each processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like.

The CPU 1310 may comprise any type of electronic data processor. The CPU 1310 may be configured to implement any of the schemes described herein, such as the processes illustrated in FIGS. 4, 6, 7, 11, and 12 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "port" will be understood to include a network interface.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An information centric network (ICN) system, comprising:
    a first point of attachment (PoA) including a non-transitory memory storage comprising instructions; and
    one or more processors in communication with the memory, wherein the one or more processors execute the instructions to:
        communicate with a first processing device identified by a device ID, the first mobile processing device expressing interest requests for content objects, the content objects comprising content data packets, and the instructions adapted to receive content objects addressed to the first processing device and being responsive to the interest requests;
        determine that the first processing device is no longer communicating with the first PoA and moving to a second PoA;
        generate a forwarding label identifying the second PoA and the device ID;
        append the forwarding label to any stored content object which was addressed to the first processing device and not yet forwarded by the first PoA to the first processing device once the first processing device is no longer communicating with the first PoA; and
        forward each said stored content object with the appended forwarding label and not forwarded by the first PoA to the first processing device to the second PoA based on the forwarding label identifying the second PoA and the device ID, and without determining whether an interest for the content has been re-expressed at the second PoA.

2. The ICN of claim 1 wherein the first PoA is configured to:
    communicate with the first processing device to receive interest packets requesting content for the first processing device, the content provided by a second processing device, the interest packets identifying the first PoA; and
    receive content objects associated with the interest packets from the second processing device.

3. The ICN of claim 1 further including the second PoA, the second PoA comprising a non-transitory memory storage comprising instructions; and
    one or more processors in communication with the memory, wherein the one or more processors execute the instructions to:
    receive content objects from the first PoA, the content objects including the forwarding label;
    store the content objects;
    determine that the first processing device is communicating with the second PoA; and
    communicate with the first processing device to forward the content objects received to the first processing device.

4. The ICN of claim 1 wherein the forwarding label includes the device ID.

5. The ICN of claim 1 wherein the forwarding label does not include the device ID.

6. The ICN of claim 1 wherein the first PoA is further configured to store in a data structure a pending interest table including for at least one entry, a record including an interest name, at least one local router face and the device ID.

7. The ICN of claim 1 wherein the first PoA is further configured to store in a data structure a forwarding label including an association between the device ID and the second PoA.

8. The ICN of claim 1 wherein the first PoA is configured to determine that the first processing device is no longer communicating with the first PoA and moving to the second PoA using a network mobility infrastructure.

9. The ICN of claim 1 wherein the first PoA is configured to determine that the first processing device is no longer communicating with the first PoA and moving to a set of candidate PoAs, one member of the set comprising the second PoA.

10. The ICN of claim 9 wherein the first PoA is configured to forward each content object not forwarded by the first PoA to each member of the set of candidate PoAs.

11. The ICN of claim 1 wherein the ICN further includes at least one intermediate router, the intermediate router comprising the non-transitory memory storage comprising instructions; and
    one or more processors in communication with the memory, wherein the one or more processors execute the instructions to:
    receive an interest request from the first PoA, the interest request associated with the device ID;
    updating the PIT entry for each interest request associated with the consumer ID upon receiving the interest request.

12. A method of operating a router in an information centric Network (ICN), comprising:
    receiving interest requests from a first PoA having a consumer processing device expressing the interest requests attached thereto;

storing a pending interest table (PIT) entry for each interest request associated the consumer processing device;

receiving a first content object comprising content data packets in response to the interest requests and forwarding the content objects based on the associated PIT entry for the consumer processing device;

receiving a second content object comprising content data packets including a forwarding label identifying, for the consumer processing device, a second PoA to which content objects associated with the consumer processing device should be forwarded; and without waiting for further interest requests for the second content object, forwarding the second content object including the appended forwarding label to the second PoA based on the identification of the second PoA in the forwarding label.

13. The method of claim 12 further including:
receiving a de-registration request from the consumer processing device; and
updating the PIT entry for each interest request associated with the consumer processing device upon receiving one of the second content objects.

14. The method of claim 12 wherein the storing includes storing a name PIT and a consumer ID PIT, which consists of multiple blocks with each block in an ID PIT including multiple memory rows.

15. The method of claim 14 wherein the interest requests comprise proactive interest requests, and the forwarding of the content object includes reading the consumer ID PIT following the reading of name PIT including a pointed memory entry in the PIT identifying a location of the full PIT entry, the PIT entry including at least one identifier associated with the request to support stateful forwarding, the identifier including at least one of the content name and an interface.

16. A non-transitory computer-readable medium storing computer instructions routing interest requests and content objects, that when executed by one or more processors, cause the one or more processors to perform the steps of:
receiving, at a first PoA, content objects comprising content data packets responsive to interest packets generated by a first processing device, the interest packets generated while the first processing device was connected to a second PoA, the content objects received from the second PoA, the content objects including forwarding labels appended to the content objects without reference to whether an interest request for the content object is expressed at first PoA, the forwarding labels identifying first PoA and the first processing device associated with the content objects using a consumer ID;
storing the content objects;
determining that the first processing device is communicating with the first PoA; and
after determining that the first processing device is connected to the first PoA, communicating with the first processing device to forward the content objects to the first processing device.

17. The non-transitory computer-readable medium of claim 16 further including wherein the second PoA is configured to:
communicate with the first processing device identified by the consumer ID and receive content objects addressed to the first processing device responsive to the interest packets;
determine that the first processing device is no longer communicating with the second PoA and moving to the first PoA;
generate the forwarding label identifying the first PoA and the consumer ID;
append the forwarding label to any content object addressed to the first processing device and not forwarded by the second PoA to the first PoA; and
forward each content object not forwarded by the second PoA to the first PoA.

18. The non-transitory computer-readable medium of claim 17 wherein the first PoA is further configured to:
determine that the first processing device is no longer communicating with the first PoA and moving to a third PoA;
generate the forwarding label identifying the third PoA and the consumer ID;
append the forwarding label to any content object addressed to the first processing device and not forwarded by the first PoA to the first processing device; and
forward each content object not forwarded by the first PoA to the third PoA.

19. The non-transitory computer-readable medium of claim 18 wherein the first PoA is configured to determine that the first processing device is no longer communicating with the first PoA and moving to a set of candidate PoAs, one member of the set comprising the third PoA.

20. The non-transitory computer-readable medium of claim 19 wherein the first PoA is configured to forward each content object not forwarded by the first PoA to the first processing device to each member of the set of candidate PoAs.

* * * * *

UNITED STATES PATENT AND TRADEMARK OFFICE
CERTIFICATE OF CORRECTION

PATENT NO.         : 10,602,416 B2
APPLICATION NO.    : 15/649452
DATED              : March 24, 2020
INVENTOR(S)        : Ravindran et al.

It is certified that error appears in the above-identified patent and that said Letters Patent is hereby corrected as shown below:

In the Claims

Column 19, Line 2 (Claim 12, Line 7): please replace "associated the" with -- associated with the --

Column 19, Line 50 (Claim 16, Line 13): please replace "at first" with -- at a first --

Column 20, Line 1 (Claim 16, Line 14): please replace "first PoA" with -- a first PoA --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*